(12) United States Patent
Tomsic et al.

(10) Patent No.: US 9,748,820 B2
(45) Date of Patent: Aug. 29, 2017

(54) SUPERCONDUCTING GENERATORS AND MOTORS AND METHODS FOR EMPLOYING SAME

(71) Applicant: HYPER TECH RESEARCH, INC, Columbus, OH (US)

(72) Inventors: Michael J. Tomsic, Troy, OH (US); Larry Long, Washington, PA (US)

(73) Assignee: HYPER TECH RESEARCH, INC., Columbus, OH (US)

( * ) Notice: Subject to any disclaimer, the term of this patent is extended or adjusted under 35 U.S.C. 154(b) by 477 days.

(21) Appl. No.: 14/557,604

(22) Filed: Dec. 2, 2014

(65) Prior Publication Data
US 2016/0380516 A1    Dec. 29, 2016

Related U.S. Application Data

(60) Provisional application No. 61/911,687, filed on Dec. 4, 2013.

(51) Int. Cl.
*H02K 9/00* (2006.01)
*H02K 55/04* (2006.01)
(Continued)

(52) U.S. Cl.
CPC .................. *H02K 9/20* (2013.01); *F03D 9/25* (2016.05); *H01F 6/06* (2013.01); *H02K 3/02* (2013.01);
(Continued)

(58) Field of Classification Search
CPC ............. H02K 9/00; H02K 55/04; H01F 6/00
(Continued)

(56) References Cited

U.S. PATENT DOCUMENTS 6,856,062 B2    2/2005   Heiberger
2010/0323900 A1*   12/2010  Kawashima .......... H01F 27/303
                                                        505/211

(Continued)

OTHER PUBLICATIONS

International Search Report and Written Opinion of the International Searching Authority for International Application No. PCT/US14/68059, Mailed Mar. 16, 2015, eight pages.

(Continued)

*Primary Examiner* — Jose Gonzalez Quinones
(74) *Attorney, Agent, or Firm* — Gallagher & Dawsey Co., LPA; Michael J. Gallagher; David J. Dawsey

(57) ABSTRACT

A superconducting electrical generator or motor having a plurality of cryostats is described. The cryostats contain coolant and a first cryostat encloses at least one of a plurality of superconducting coils. A first coil is in superconducting electrical communication with a second coil contained in a second cryostat through a superconducting conduction cooling cable enclosing a conductor. The first cryostat and the second cryostat may be in fluid communication through at least one cryogen channel within the at least one superconducting conduction cooling cable. In other embodiments, none of the plurality of cryostats may be in fluid communication and the cable may be cooled by conduction along the conductor from the first or second cryostat, or from both. The conductor may have different segments at temperatures equal to or above the temperature of the coolant and the superconducting conduction cooling cables may be connected through quick connect fittings.

20 Claims, 15 Drawing Sheets

(51) Int. Cl.
    *H01F 6/00*     (2006.01)
    *H02K 9/20*     (2006.01)
    *H01F 6/06*     (2006.01)
    *H02K 7/18*     (2006.01)
    *H02K 3/02*     (2006.01)
    *H02K 3/50*     (2006.01)
    *F03D 9/25*     (2016.01)

(52) U.S. Cl.
    CPC .............. *H02K 3/50* (2013.01); *H02K 7/1838* (2013.01); *H02K 55/04* (2013.01); *H02K 2201/15* (2013.01); *Y02E 10/725* (2013.01); *Y02E 40/625* (2013.01)

(58) Field of Classification Search
    USPC ................ 310/52, 54; 290/55; 505/163, 211
    See application file for complete search history.

(56) References Cited

U.S. PATENT DOCUMENTS

2011/0277953 A1* 11/2011 Mizutani ................ H02K 55/02
    165/47
2012/0306212 A1* 12/2012 Sarmiento
    Munoz ................. H02K 7/1838
    290/55
2013/0181553 A1* 7/2013 Wu ...................... H02K 7/1838
    310/53

OTHER PUBLICATIONS

X. Song, N. Mijatovic, B. B. Jensen, "Design study of a fully superconducting generator employing MgB2," Applied Superconductivity Conference (ASC 2014), Charlotte, North Carolina, USA, Aug. 2014.

Swarn S. Kalsi, "Superconducting Wind Turbine Generator Employing MGB2WINDINGS Both on Rotor and Stator",IEEE, 2014.

Clive Lewis, "HTS Power Generators," Converteam, Nov. 2007.

Ronghai Qu et al., "Review of Superconducting Generator Topologies for Direct-Drive Wind Turbines," IEEE/CSC & ESAS European Superconductivity News Forum (ESNF) No. Jan. 23, 2013.

W. Stautner et al, "A Cryo-Free 10 T High-Field Magnet System for a Novel Superconducting Application," IEEE Transactions on Applied Superconductivity, vol. 21, No. 3, pp. 2225-2228, Jun. 2011.

"SeaTitan™ Wind Turbines the World's Most Powerful Wind Turbines," Sea Tital Data Sheet, AMSC Windtec GmbH.

* cited by examiner

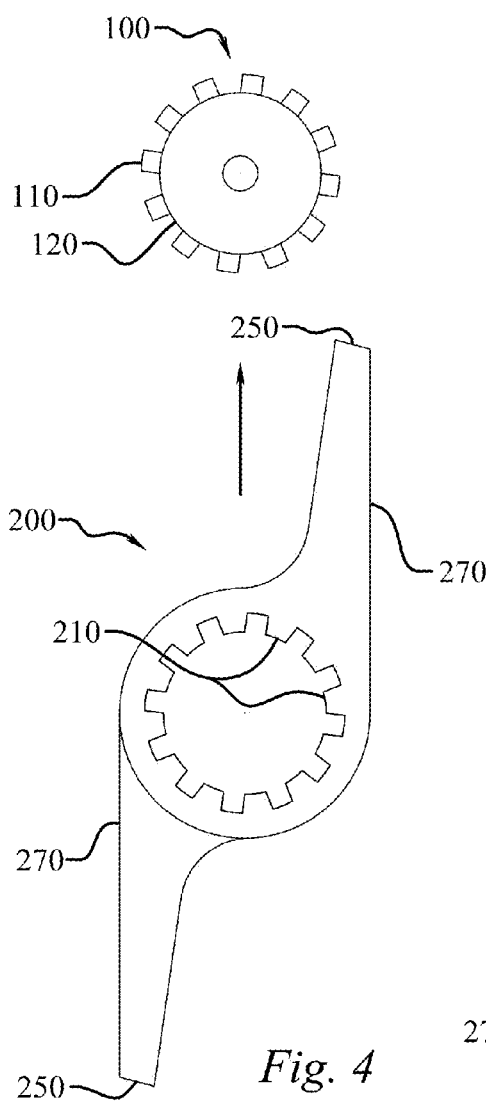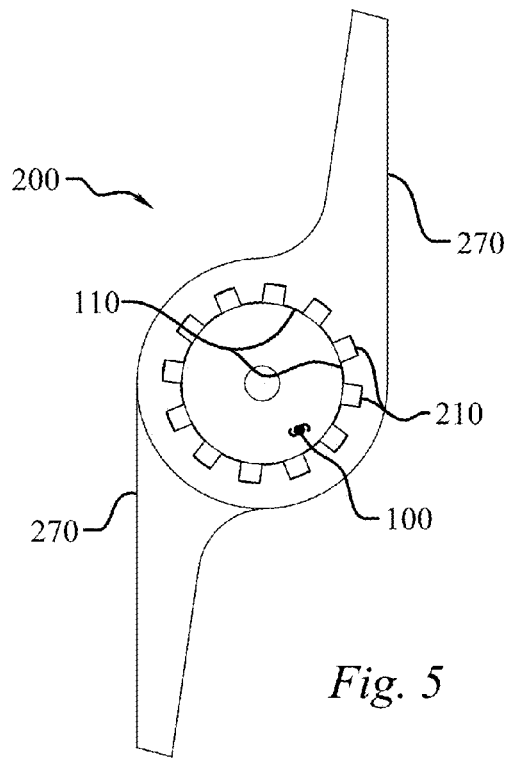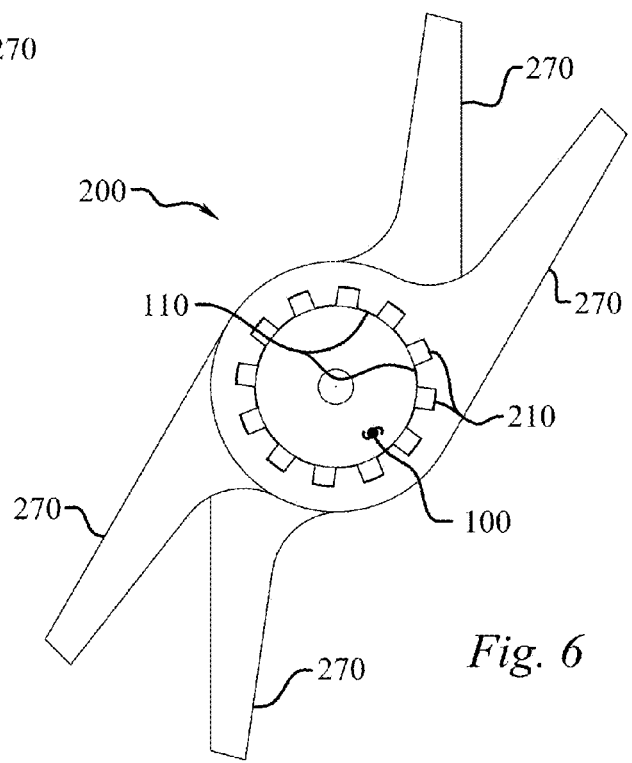
Fig. 4
Fig. 5
Fig. 6

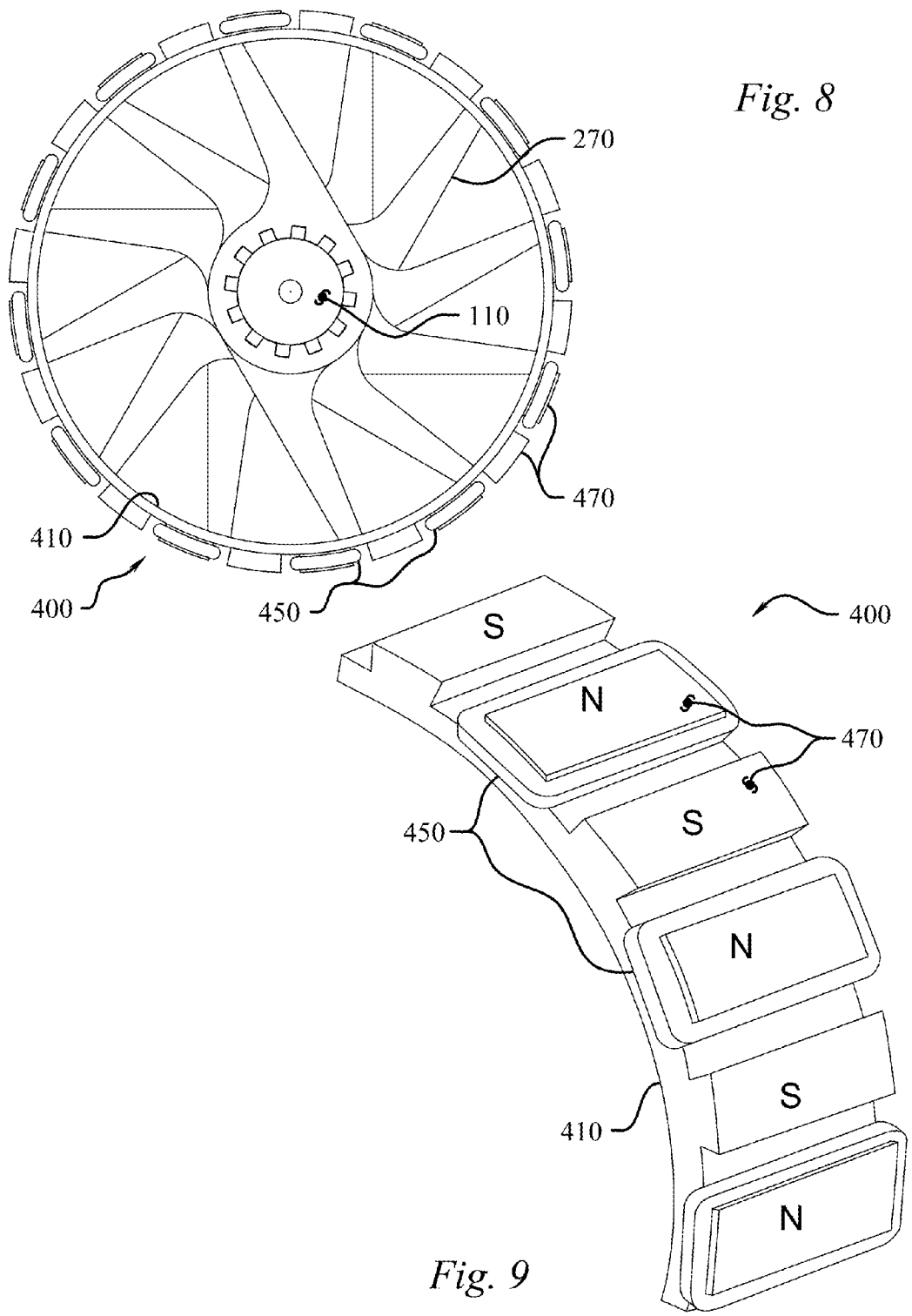

SUPERCONDUCTING GENERATORS AND MOTORS AND METHODS FOR EMPLOYING SAME

CROSS-REFERENCE TO RELATED APPLICATIONS

This application claims the benefit of U.S. provisional patent application Ser. No. 61/911,687; filed on Dec. 4, 2013; all of which is incorporated by reference as if completely written herein.

STATEMENT REGARDING FEDERALLY SPONSORED RESEARCH OR DEVELOPMENT

This invention was made with government support under grant DE-SC0009203, awarded by the Department of Energy. The government has certain rights in the invention.

BACKGROUND OF THE INVENTION

An increased use of superconducting generators and motors will occur for a number of reasons. Generator ratings are increasing making superconducting efficiency more important. Applications, particularly for wind power, include land-based, offshore and remote locations. Present technologies, such as the use of high speed iron gearboxes, are problematic because the gearboxes are too unreliable and heavy. Direct drive machines are becoming popular because they do not have gearboxes, but these are very heavy and difficult to transport and install.

Direct drive superconducting generators are potentially lighter, but the topology associated with wind generation makes current proposed superconducting wind generator systems less practical. Present superconducting designs generally utilize an old-style single cryostat and a superconducting rotor in which all components are cold. They also feature large and fragile torque tubes. These units suffer many single point failures.

These units must be built and shipped and installed as a single piece. The rotating seals isolating the cryostat are problematic, especially as traditional topology is not well suited for harsh and unattended environments. Traditional superconducting materials, such as yttrium barium copper oxide (YBCO) and bismuth strontium calcium copper oxide (BSCCO) conductors are very expensive. Any failure effectively kills the machine and requires that an entire machine be removed, shipped to a factory, repaired and reinstalled; every step of which results in a very expensive process. The associated long down-time, high cost, make such installation economically unviable.

Consequently, a new technology has to be developed that allows 5-20 MW (megawatt) generators that solve these main problems of large direct drive superconducting generators. The present invention, among other advantages, addresses all of these issues with a lower cost, highly reliable, repairable on site, easily transported, installed and repaired superconducting generator that meets the needs of high power (>5 MW wind energy systems) installations. These ends are accomplished in part without a single large cryostat with fragile structure and in which single point failures can be catastrophic. The present embodiments of the invention do not use a complex and large cryostat/torque tube design. There are no single large cold areas, just cool areas that need to be cryogenic (i.e. coils); where redundancy means that the installation can lose a coil, or even two, and generator can keep running. There is an elimination of many problem areas including a single big cryostat, torque tube, and the introduction of multiple redundant cryostats. Further, the design employs multiple topology improvements to improve manufacturing, transportation, installation, and repair.

The existing state of the art for non-superconducting wind generators includes high speed generators which are relatively light, and gear boxes that are heavy and unreliable; and direct drive conventional generators are heavy, but reliable. These large gear boxes and large direct drive generators are limited in their ultimate rating on wind towers and pose transportation, assembly and repair issues, especially in regards to remote land and/or offshore locations. Direct drive superconducting generators will be potentially lighter than conventional units (high speed generator and gear boxes), but they are still big and heavy with regard to transportation over highways in the 5-20 MW rating. Present traditional superconducting designs can be unreliable and prone to single point failures, hard to repair and hard to transport and install.

What are needed are direct drive superconducting generators with new topology that overcome traditional superconducting generators' problems and which are well suited to wind applications. The superconducting generator can be used as direct drive without a gear box, or can also be used with a highly simplified one stage gearbox that yields high reliability and is lightweight.

High Power Wind Platforms (5-20 MW) will offer significant economies of scale and may be required to make wind energy economically viable. At present, many wind platforms use high speed (1200 to 1800 rpm) generators driven through large, heavy, and historically very unreliable, multistage gearboxes. Direct drive (low rpm) generators are being explored to eliminate the highly unreliable gearboxes, but this results in very large and very heavy generators, and the problem promises to get much worse as wind platform outputs exceed 5-6 MW and approach 10-20 MW. The large size and high weight of proposed conventional (iron-based, non-superconducting) direct drive generators may make proposed high power wind platforms logistically and economically impractical.

There are significant logistical issues associated with platforms rated above 4 MW for land systems and 8 MW for offshore systems. Economies of scale suggest that wind platforms may be more economically attractive if their ratings can be pushed to 5-20 MW.

High speed multi-megawatt generators can be of a manageable size and weight but the relatively large and heavy gearboxes needed to drive the generators are proving to be very costly, unreliable and expensive to maintain, and are the key limiting factor to the economic viability of multi-megawatt wind systems. This problem will become much worse as the output of these emerging systems exceeds 5-8 MW and may prevent the commercialization of high power wind systems. In order to eliminate the gearboxes, direct drive systems are being proposed, but the large size and weight of low speed (6-12 rpm) generators make this equipment very difficult to transport and assemble in offshore or remote land locations. The towers needed to support these heavy generators are also difficult and very expensive to build, again especially in remote land or offshore locations. Accordingly, size, weight and reliability issues along with transportation, assembly and maintenance issues may prevent the commercialization of high power (5-20 MW) wind systems without further technological advances.

A high speed traditional superconducting generator with a gearbox would have some weight advantages, but would pose reliability issues with the generator and gearbox. A low speed direct drive conventional generator (no gearbox) might be reliable but would also likely be very large and heavy, thus posing numerous transportation, installation and repair issues. A low speed direct drive traditional superconducting generator would be lighter, but still large, and again would entail transportation, installation and repair issues and generator reliability concerns. The low speed direct drive superconducting generator proposed herein would be significantly lighter, have minimized transportation, installation and repair issues, as well as having a more reliable generator. The mid-speed superconducting generator with a single stage gearbox, also proposed herein, would also be a light weight system, with minimized transportation, installation and repair issues, and would also have a high degree of reliability.

Generator Power and Power Density Generator power outputs are governed by the equation:

$$\text{Generator Power} = \text{Const} * D^2 * L * B * A * rpm, \text{ where:}$$

D=Rotor Diameter
L=Rotor Active Length B=Magnetic Field
A=Stator Current Density
Rpm=Rotor Speed (rpm)

In a comparison of high speed vs. low speed generators, using traditional iron-based technology, flux densities are the same (2 Tesla) and stator current densities are the same, and limited by cooling technology in copper conductors. Although low speed generators can be larger in diameter than high speed machines, this increased diameter does not make up for the low speed.

Traditional high-speed iron-based generators are well proven with reliable technology, as seen in utilities and commercial systems, and are reasonably small and of moderate weight. As said, the technology is proven and readily extendable to tens or thousands of MWS. High-speed (1,800 rpm and above) iron-based generators can be small, lightweight, transportable and reliable and would be the system of choice if they did not require a gearbox to increase speed.

The issues surrounding speed increasing for multi-megawatt gearboxes are complex. High power speed-decreasing gearboxes are relatively large and heavy, however, they are at least fairly reliable, for example, as seen in ship drives and other present applications. Proposed wind systems, however require multi-MW multi-stage speed increasing gearboxes which are large, heavy and very unreliable. They are responsible for the bulk of systems failures and are difficult and expensive to maintain. A single stage gearbox design, however, decreases reliability and maintenance issues and results in large weight reduction. "High-Speed" (1800 rpm) generators are relatively lightweight but they require large and heavy gearboxes that are extremely unreliable and are, in fact, proving problematic as power levels increase. Direct drive (10 rpm) generators eliminate the troublesome gearbox, but these generators are very large and heavy, a major problem for shipping installation, repair and tower support requirements. These problems are intensified as power levels increase.

As an interesting alternative to direct drive; a "Hybrid Drive" (Single Stage 4:1 Gearbox and a 40 rpm superconducting generator) offers great advantages. The generator is significantly smaller and lighter and single stage gearbox is lighter and can be highly reliable.

Disadvantages of Present Superconducting Wind Generators

Present superconducting wire generators pose a number of problems. The conductors themselves are fragile, when compared to copper. Fragile, complex hardware is needed to support and cool conductors to extremely low temperatures, such as cryostats, torque tubes, cryocoolers, and rotating cryogenic seals. Cryogenic rotors cannot be repaired on site and have many single point failure mechanisms. These machines tend to be unreliable, virtually impossible to repair on site and must be transported and installed as a single unit, making them large and heavy, and therefore very difficult to transport and install in remote locations on land or offshore. Traditional superconducting generator designs have unproven reliability, especially in harsh environments.

Some superconducting generator designs being developed for direct drive wind platforms have adopted many of the traditional superconducting generator topologies developed for previous land-based high speed superconducting generators. These topologies are large, heavy and ineffective for the needs of emerging high power wind energy platforms. A new topology is needed that specifically addresses the previously discussed issues.

Specific Problems with Presently Evolving Superconducting Generators

One traditional "One Big Cryostat" design enclosing the entire rotor and mechanism, including an entire internal structure, can be operated at cryogenic temperatures. It is susceptible to major heat leak and the large cryostat has to be shielded from eddy losses. The large structure is vulnerable to small pinhole leaks and cracks in its very large structure that will completely disable the entire machine. Even a small leak will likely require that the generator be removed from the platform, returned to the manufacturer, repaired, returned and reinstalled. This consumes a great deal of time, money and downtime.

Traditional torque tubes are not well suited for very high torque, low speed, generators with large pulsating loads. They are traditionally used in high speed applications where torque is relatively small and in lower power machines where the torque tube is small. It can be very complex to absolutely minimize the heat leak through the torque tube.

Cylindrical rotors are, typically used on small diameter machines (10 inches to 4 feet) due to the reasonable proportions required. Wind generators, however, will be very large in diameter and have a large amount of relatively empty space in the center. A torque tube for these machines will be very large in diameter and have a great deal of weight and material and potential heat leak, also it will add significantly to the overall length of the rotor and therefore to the generator. They are fragile and have significant heat leak, significant added length and significantly reduced stiffness of the shaft.

A New Design Approach to Superconducting Generators in Wind Platforms

A unique superconducting coil configuration may have a plurality of small cryostats. Only the superconducting coils are cold and each is enclosed in its own small cryostat. There is less surface area and therefore heat leak than with a traditional large cryostat and torque tube, with a resulting lower cooling requirement and need for fewer cryocoolers. The design may have one-half the number of coils (1 per pole pair), and again fewer cryostats lower the cooling requirements. A wavy wound stator winding allows the generator to function even if one or even two rotor coils or cryostats fail, thus promoting high reliability and far less expensive maintenance.

Coils and cryogenic components can be replaced on-site quickly and inexpensively and their high redundancy and reliability minimize traditional single point failures. The design promotes easy on-site repair and replacement of most critical generator parts (such as cryogenic rotor parts). This approach will also work for all cryogenic machines where the stator is also superconducting. The plurality of cryostats are small and more robust and reliable, and designed to be easily replaced or repaired on-site with small interchangeable modules. A small inventory of interchangeable parts greatly reduces repair and maintenance costs and downtimes. Again, the redundancy of a wave wound stator winding allows the generator to continue to function even if a rotor coil fails, a significant benefit and one not possible with traditional superconducting generators.

Generators in Wind Platforms: Cooling Systems and Coolant

Each of the plurality of redundant cryostats has a small required capacity. It is possible to have rotating cryocoolers to provide coolant to the cryostats, thereby eliminating chronic problems found with rotating cryogenic seals. Liquid hydrogen ($LH_2$) might prove to be a superior coolant, as some superconductors work well at 20 K, and $LH_2$ is cheap and easily replenished on-site, which is also a factor driving the use of magnesium diboride ($MgB_2$), as liquid helium is developing a shortage issue.

The design has no large vulnerable single cryostat and no large, complex and vulnerable torque tube. The cryosystem cools only the coils, not the entire structure. There are lower cooling requirements since the area of small cryostats has less surface area and cooling requirements than that of traditional big cryostat. The rotor and stator may be built in small lightweight segments, enhancing shipping installation and allowing fast on-site repairs. A modular design allows for replacement of critical parts from small inventories of standard parts and the rotor design eliminates many traditional failure points and provides redundancy.

The design may have one-half the number of rotor coils, because one superconducting coil could drive two poles in the generator, which could mean one-half the risk of cryostat failure and the wavy wound stator windings can allow the generator to continue to operate with one and possibly two rotor coil failures. It may be possible to eliminate rotating seals by mounting cryocoolers on the rotor with lockup seals for recharging the system. YBCO is unlikely to be economical or available in sufficient quantities or long enough lengths, and BSCCO remains very expensive, thus making $MgB_2$ a likely choice.

Superconducting Generators Will be Needed as Ratings Increase Above 5 MW

While non-superconducting designs may be designed to work on tall towers and long blades; the difficult task of minimizing weight on such towers will be essential as ratings increase. A proposed single stage gearbox (4:1) helps reduce weight. For a large MW machine, the gearbox weight can be reduced by incorporating the gearbox into the end bell housing of generators.

SUMMARY OF THE INVENTION

Numerous variations, modifications, alternatives, and alterations of the various preferred embodiments, processes, and methods may be used alone or in combination with one another as will become more readily apparent to those with skill in the art, with reference to the following detailed description of the preferred embodiments and the accompanying figures and drawings.

In its most general configuration, the present invention advances the state of the art with a variety of new capabilities and overcomes many of the shortcomings of prior devices in new and novel ways. In its most general sense, the present invention overcomes the shortcomings and limitations of the prior art in any of a number of generally effective configurations. The instant invention demonstrates such capabilities and overcomes many of the shortcomings of prior methods in new and novel ways.

Advantages of the method of the specification include, but are not limited to, increased power generation capacity for a given weight of generator. The design includes innovations that overcome many of the numerous design limitations of presently evolving superconducting generators that were never designed to function in the very harsh, remote environments typical of future wind platforms. The design not only minimizes the size and weight of the generator itself, but incorporates many novel features that eliminate many of the traditionally fragile and unreliable components of traditional superconducting generators. The design also eliminates many traditional single point failure mechanisms and has a great deal of redundancy, allowing the generator to continue to operate even with the loss of a superconducting rotor coil, cryostat or several cryostats. Finally, the design addresses the problems encountered in transporting, installing and repairing very large superconducting generators and overcomes these issues by using a modular design. The generator described will be required if superconducting wind generators systems greater than 5 MW are to become economically viable.

Generator Assembly Procedure; Main Generator Components

First, the generator end brackets with first stator sector are installed, followed by assembling stator quadrants into the generator end brackets. Next, the shaft may be assembled into generator bearing brackets and rotor quadrants installed on rotor supports. Next, all rotor quadrants may be installed, followed by the installation of all stator quadrants, thus making the assembly of the generator body complete as the top half of the generator end brackets are put in place. It would be equally simple to employ generator repair procedures such as removing and replacing a defective rotor pole, or replacing a top half of a bearing bracket.

Lightweight superconducting generators will be an enabling technology for large (>5 MW) wind platforms presently being developed. Large (5+MW) reliable wind platforms may also be essential (economies of scale) for the economic viability of wind power. Superconducting generator designs presently being developed are poorly suited for remote and harsh operating environments. In addition, poor or unproven reliability, single point failures, the inherent fragile nature of superconducting generators and the problems of transporting, installing and repairing these large superconducting generators may prove to be their downfall.

Embodiments of the present design have developed an innovative and economical design of a large superconducting generator specifically designed for the harsh physical environment of wind platforms. The design overcomes many of the design flaws inherent in traditional superconducting generator designs, eliminates many single point failure mechanisms, adds redundancy and reliability and overcomes the transportation, installation and repair problems inherent in other large single piece superconducting generators presently being developed.

Superconducting Wind Generator Design Background

A lightweight direct drive superconducting generator is described that meets the needs of emerging high power (5-10 MW) land-based wind platforms. The design is directly scalable to 10-20 MW systems for offshore wind systems. The growing market for wind energy platforms is presently being met in the United States by 2-3 MW land based platforms that use conventional iron-based high speed (1,800 rpm) generators driven through multi-stage speed-increasing gearboxes. The generators themselves are relatively lightweight and are highly reliable, but the gearboxes used to drive them are large, heavy, expensive, relatively unreliable and are responsible for the bulk of system failures. In order to eliminate these gearboxes, system planners are pursuing the design of low speed direct drive generators connected directly to the wind turbine's rotor (blades), thereby eliminating the troublesome gearboxes. These low speed direct drive generators will be very large and heavy, and thereby introduce a variety of serious problems including transportation to and installation at remote sites, and the increased structural requirements of the towers needed to support these large heavy generators. While these problems are more easily solvable for systems rated at 2-3 MW, they become serious problems for 5+MW land based systems. Developers are now pursuing the design of higher rated systems (6-20 MW) in order to reduce the cost of energy by achieving an economy of scale from higher rated systems. As generator rating increases to 5 MW and above, the size and weight of traditional low speed iron based non-superconducting generators increases dramatically and will present serious logistical and economic problems in transporting and installing these machines in remote sites, and in building the towers needed to support them. Available transportation equipment will quickly become overloaded, and moving generators over small roads, bridges, and other difficult access problems will become very costly, if not cost-impractical. In addition, once the generators reach the installation site, very large cranes will be required to lift them onto the taller and taller towers needed to accommodate the longer blades that produce increased power. Finally, building taller towers and requiring them to support heavier equipment will present its own set of serious structural and economic problems that will threaten the commercial viability of these larger wind energy systems.

Given these issues, system developers are looking for ways to reduce the weight of large generators. While several relatively traditional approaches are being explored (including permanent magnet iron-based generators) a very promising approach uses superconducting technology. Superconducting technology offers great potential for significantly reducing the weight of high power generators by allowing the minimization of the use of heavy magnetic iron typically needed to support the magnetic fields in traditional generators. Superconducting technology can reduce the weight of high power generators by as much as 50%, thereby significantly reducing the weight-related transportation, installation and tower structural issues, and potentially providing the enabling technology needed to commercialize high power wind energy systems.

There are many superconducting generator designs being developed by several organizations. Most of these generator designs are, however, based on traditional superconducting generator topologies, which were developed for small diameter, high speed land based systems, and which are poorly suited to the requirements of very large diameter, low speed, high torque generators operating in the harsh commercial environments such as those encountered in wind platforms. These traditional designs typically have large fragile cryogenic cyrostats enclosing most of the rotor and large fragile thermal management torque tubes, which are also poorly suited to the very high torque requirements of wind generators. They have historically been unreliable with numerous single point failure mechanisms, low component redundancy, high forced outage rates, and very long repair times. Such superconducting generators are manufactured and shipped in one or two large pieces (rotor and stator) that will be difficult to transport and install, and worse, will be virtually impossible to repair on-site. Repairs will require that the entire generator be removed from the tower, transported to a possibly distant facility, repaired and returned to the wind tower; all very long and expensive processes.

Traditional superconducting generator topology and design methodologies are unlikely to be suitable for wind platforms, and so, the conceptual design of a cost effective, lightweight 5 MW (scalable to 20 MW) superconducting generator with alternative design topologies that meet the needs of commercial wind platforms is important. Designs are sought that eliminate the traditional large fragile cryostats and torque tubes, and replace the traditional rotor with a simple lightweight warm (non-cryogenic) structure and a series of small cryogenic cryostats/coil assemblies that minimize the number of cryogenic rotor components, while vastly improving the reliability and ruggedness of the rotor. Various embodiments of the design also greatly improve reliability by eliminating many of the traditional single point failure mechanisms, and providing component redundancy that allows the generator to continue to function even if some components fail. This dramatically reduces down time and improves forced outage rates to levels expected from commercial equipment. Embodiments of the superconducting generator of the instant invention also use, in some embodiments, the only currently economically viable superconductor ($MgB_2$), which allows it to meet commercial cost requirements now and in the future. Finally, the generator is designed with a unique modular structure that allows it to be shipped and installed in modular segments, each of which is small and lightweight enough to be shipped to remote sites by readily available transportation systems and installed atop tall towers using available cranes. Although designed for high reliability, the most critical component of the generator (the cryogenic components) are designed to be easily removed and repaired or replaced on-site without removing the generator from the tower. The modularity greatly reduces the cost of transporting, installing, repairing, maintaining and operating the generator, and the superconducting technology employed dramatically reduces the weight of high power direct-drive generators while meeting the reliability and availability expected of commercial power generation equipment. The innovative design features of this generator overcome the inherent debilitating problems encountered with traditional superconducting generators and provide a viable high power commercial generator needed to enable high power wind energy systems.

General Design Approach

A detailed conceptual design of a lightweight, transportable generator rated at 5-6 MW that would meet the needs of commercial wind energy platforms has been developed. The design uses present and near-term technologies and may be directly scalable to 20 MW in order to meet the long-term power requirements projected for both land based and offshore wind systems. As described above, one assumption made was that minimizing the weight of the generator was of paramount importance and numerous generator technologies and topologies were explored, ranging from traditional iron-based to ironless superconducting generators, and including traditional configurations such as synchronous, wound rotor induction, homopolar, and several so-called "novel" topologies.

One conclusion was that a preferred technology was a superconducting synchronous generator with a multi-pole superconducting rotor and a traditional, though enhanced, laminated iron stator with liquid cooled copper conductors.

The stator uses the minimum amount of iron required for the structural support of the stator and conductors while providing magnetic field enhancement for high power density. The superconducting generator design uses new topologies and components, and avoids traditional superconducting generator topologies which have made these generators unreliable and ill-suited to the harsh operating environment of wind energy systems. Several design embodiments were explored, such as building an air core copper stator, using non-traditional windings such as the "helical" stator winding, and using an air core superconducting stator winding, but were rejected at the present time for practical reasons, including low reliability, high cost, unacceptable mechanical stresses, low efficiency and reduced operating life. It is specifically contemplated that further research and development may make such alternate embodiments feasible, as would be known to one skilled in the art at the time.

Although a major design goal was to reduce the total weight of the generator, several other key requirements were included to meet the practical and operational requirements of these generators as an integral part of the overall wind platform system. The key goals for this generator design were:

Low Weight: The generator must be designed for minimum weight. This is important for ease of transportation to and installation atop tall towers but is especially important for the cost and feasibility of building the towers required to support the high power generators and other top mass equipment. The direct drive generator rating selected in one embodiment was 5 MW at 10 rpm, which was chosen so the generator could serve as a credible full-scale proof-of-principle demonstrator that could be tested thoroughly on a wind test stand. The design had to be easily and directly scalable to 20 MW to meet full range of power requirements projected for future land based and offshore wind systems. While both weight and size are important design parameters, the very low operating speeds (6 to 12 rpm) of direct drive generators tends to prevent the production of very small machines. The minimum weight of 5-20 MW generators will likely be achieved with machines that will generally be 5-7 meters in diameter with axial lengths ranging from 1.5 to 4 meters.

High Reliability and Component Redundancy: These will be required to reduce forced outage rates to acceptable commercial levels and to reduce maintenance and repair costs. Additionally, the generators should be designed with component redundancy, which will allow them to operate even with the loss of a critical component. Traditional superconducting generator designs have large fragile cryostats and torque tubes, numerous single point failure mechanisms, and little if any component redundancy. A preferred design approach eliminates the large fragile cryogenic components and most single point failure mechanisms, and incorporates high component redundancy in order to obtain the high reliability, low forced outage rates, and low maintenance and repair costs that are similar to those achieved with commercial power plant equipment.

Ease of Transport and Installation: As projected power levels increase, so does the size and weight of the generators. Transporting these generators to remote installation sites quickly becomes a logistical and economic problem. The limits of readily available transportation equipment can be easily exceeded and the cost of transporting very large and heavy equipment (including specialized vehicles and temporary modifications of roads, bridges, power lines, etc.) can quickly become cost-prohibitive. Moreover, once at the remote site, the ability to lift large heavy pieces of equipment atop taller and taller towers becomes a limiting factor due to both the availability and limitations of cranes required to lift the equipment, and the cost and structural limits of the towers themselves. One solution is to design a lightweight generator built from small, lightweight modules that can be easily transported by readily available equipment along available roads, bridges, etc. Once at the installation site the small modules can be more easily lifted to the top of the platforms by available or slightly modified cranes and potentially by small crawler cranes built into the tower.

On-Site Repairs: The modular generator design not only allows the generator to be more easily assembled atop the towers, but the generator was designed so that critical components and even entire modules could be easily replaced on-site, without removing the entire generator from the platform. Traditional superconducting generators are designed with a single piece rotor and all critical components are sealed inside a large fragile vacuum insulated cryostats. In this configuration, critical cryogenic components and other complex structures that are prone to failure cannot be repaired on-site. In the event of a component failure the entire generator must be removed from the tower, transported to a repair facility, laboriously repaired, then returned and reinstalled; a very long and very expensive process.

Cost Effective Design Adaptable to New Technologies: The cost of the generator is an important factor that directly affects the cost of energy. As such the cost of manufacturing and operating the generator must be very competitive with the cost of traditional power system equipment. Reducing generator manufacturing and operating costs are an important part of the design process. Additionally, while the generator is designed to use the best available and near-term technologies, it was designed to easily incorporate improved components and technologies as they emerge in the future.

Detailed Design Approach

An assessment of candidate direct drive wind generator technologies and the requirements of high power wind platforms were conducted. Based on this assessment a full-scale 5 MW salient pole superconducting generator topology was selected as the most beneficial topology to use in design of a proof-of-principle generator for emerging high power (5-20 MW) wind systems. 5 MW was considered as the minimum power at which superconducting technology was reasonable, and there was little benefit seen to designing and testing a 0.5-1 MW "subscale demonstrator" that must ultimately be scaled up significantly to prove its viability in large wind platform applications. The cost of a subscale demonstrator is not significantly lower than the cost of a 5 MW full-scale demonstrator, and the successful test of a full-scale machine minimizes the technical risk, provides design credibility and accelerates the acceptance and commercialization of these machines.

In order to meet the general design goals described above, many of the traditional high speed superconducting generator design features which have historically led to unreliable generators that will be ill-suited to wind power systems were eliminated. Alternative generator components and topologies were selected that will be well-suited to low speed high torque wind systems. The design approach resulted in a lightweight generator which reduces traditional single point failure mechanisms, incorporates unique redundancy in all cryogenic systems for high reliability, and presents a modular design which is easy to transport, install and if required, repair on-site. Key features of the design include:

Desirable and Highly Simplified Superconducting Rotor Features:
1. No large cryogenic vacuum insulated cryostat or complex torque tube
2. Very lightweight, high torque warm rotor structure
3. Only cryogenic coils are cold while the remainder of rotor structure is warm
4. One-half the number of cryogenic rotor coils yields high reliability
5. Redundancy in cryogenic cooling system components
6. Redundancy in cryogenic rotor coils
7. Economical superconductor ($MgB_2$)
8. Modular rotor design that allows easy shipping and installation with small lightweight modules
9. On-site repairs are feasible Stator Features:
1. Proven highly reliable stator technology
2. Liquid cooled copper conductors
3. Minimum amount of laminated iron serves as structure, protects coils and enhances magnetic fields
4. Unique stator winding allows continued generator operation even with the loss of a cryogenic rotor coil (possibly 2 coils)
5. Modular stator design allows easy shipping and installation of the stator in small lightweight modules
6. On-site repairs are feasible

BRIEF DESCRIPTION OF THE DRAWINGS

Without limiting the scope of the Method for Constructing Superconducting Generators therefrom as claimed below and referring now to the drawings and figures, all shown not-to-scale:

FIG. 4 shows an end view of a torque strut in position to be mounted over the end of a rotor shaft;

FIG. 5 shows two over-lapped torque struts mounted on a rotor shaft;

FIG. 6 shows four over-lapped torque struts mounted on a rotor shaft;

FIG. 8 shows an end view of a rotor consistent with the present invention;

FIG. 9 shows details of a rotor surface consistent with the present invention, and showing associated rotor coils;

Figure 1:
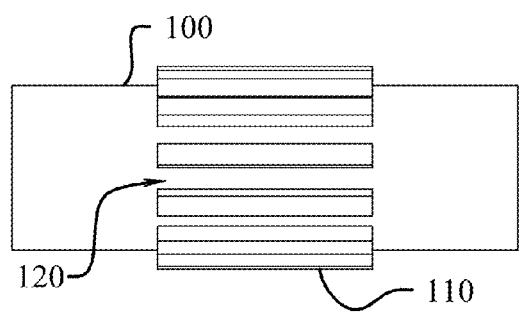
FIG. 1 shows a longitudinal view of an embodiment of a rotor shaft.

These drawings are provided to assist in the understanding of the exemplary embodiments of the device as described in more detail below and should not be construed as unduly limiting the device. In particular, the relative spacing, positioning, sizing and dimensions of the various elements illustrated in the drawings are not drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

The method for method for constructing superconducting generators as depicted in some embodiments, by way of illustration and not limitation in FIGS. 1-18, discloses certain embodiments, by way of example only, of superconducting generators and methods for employing the same.

The detailed conceptual design of an embodiment of a full size 5 MW direct drive superconducting wind generator, and by extension, of similarly designed motors, is described. As one skilled in the art would know, motors and generators are electromagnetic devices. They have current-carrying loops that rotate in magnetic fields. This rapidly changing magnetic field produces electromotive forces, called emfs or voltages. Electric motors and generators are the opposite of each other. Electric motors convert electrical energy into mechanical energy, while electric generators convert mechanical energy into electrical energy. Therefore, in all cases in which this specification uses the term "generator(s)," including in the claims, the term "motor(s)" is also intended.

Superconducting technology will become viable for 5-6 MW land based wind systems, and will be the enabling technology when ratings reach 10-20 MW for land based or offshore systems. Wind turbines will likely operate at 6 to 12 rpm for these systems. In order to design a realistic generator the following design parameters for the generator were initially selected, although others are possible and will be appreciated by one skilled in the art:

Power Output: 5 MW (Directly scalable to 20 MW)
Rotor Speed: 10 rpm
Output Voltage: Approximately 800 to 1,300 Vrms, 3 Phase
Power Factor: 0.90

Based on an assessment of other key operational requirements, the following additional generator characteristics were selected:

Generator Topology: Multi-pole synchronous superconducting rotor
Superconductor: $MgB_2$
Cryogenic Coolant: GHe/LHe or $LH_2$
Coil Winding Operating Temperature: 20K
Cryocoolers: CRYOMECH™ A325 (Cryomech, Inc., Syracuse, N.Y., USA)
Stator Winding: Three phase alternating current winding
Liquid cooled copper
Traditional diamond shaped coils
Coolant: EGW or oil with air or water heat exchanger
Stator Core: Laminated iron teeth and structural back iron Rotor Design Traditional high speed superconducting generators are relatively low diameter machines and generally enclose the majority of the rotor in a large (and fragile) vacuum insulated cryostat, which thermally isolates the superconducting rotor and coils from the warm ambient environment. This large cryostat is typically connected to a high speed drive shaft by a somewhat complex thermal torque tube which transitions from cryogenic temperatures to the warm ambient environment. In this configuration, the internal structural members of the rotor are operated at cryogenic temperatures. The large cryostat and torque tube contain many single point failure mechanisms and cannot be easily repaired on-site. Cryogenic coils or other delicate internal structures are also prone to failure and cannot be repaired on-site.

The very high torque large diameter rotors required for low speed direct drive wind generators (4-6 meters) do not lend themselves to the traditional superconducting generator design topology of enclosing a very large rotor in a cryostat with a very high torque thermal transition tube. This would result in a very unreliable design that would be very ill-suited for wind energy systems. A single pinhole vacuum leak or damage to any internal superconducting coil or cryogenic component would require an immediate generator shutdown, removal of the generator from the tower and extensive and costly repairs at a repair facility. While many companies are pursuing this traditional superconducting design (or small variants) for wind systems, it is highly unreliable and therefore unacceptable. An alternative approach and preferred one is that in which the majority of the rotor structure is operated at ambient temperatures and only the cryogenic rotor coils operate cold. This eliminates the large and fragile cryostat and torque tube, dramatically improves generator reliability, and, as described below, allows for quick and easy on-site repairs to any damaged rotor components.

Rotor Structure

The low speed generator rotor will be subjected to very high torques and the central radial structure must be strong and rigid enough to accommodate the steady state, dynamic and transient torques encountered during the 20-30 year operating life of the generator. A great advantage of the low speed generator is that the centrifugal loads on rotor components are very low which significantly simplifies the structural design of these machines. Components on a 4 meter 10 rpm rotor are subjected to less than ¼ "G" compared to over 3,000 "G's" in a large 1,800 rpm utility generator.

A preferred rotor design consists of a central drive shaft with radial structural members (metal and composites being possible rotor materials) that connect the central shaft to a warm magnetic steel rim, which supports a series of small cryostats, each of which contains a superconducting rotor coil. The traditional complex torque tube is replaced with simple radial torque struts that operate at ambient temperature.

Because of these factors an alternative rotor structure was developed in which the central rotor shaft is made of a lightweight steel structure and is attached to the outer rotor rim through a series of simple and inexpensive metal radial torque struts. Further details of the radial torque strut design may be seen in FIGS. 1-8, and will be described below. The struts are simple to manufacture, lightweight, easy to assemble, and can be made of either steel or aluminum alloy. Because of these factors this rotor configuration was selected as the rotor structure of choice.

The internal rotor structure supports a segmented rim consisting of annular magnetic steel plates which support laminated magnetic rotor poles and small individual superconducting coils each enclosed in its own cryostat, as seen well in FIG. 5.

In this simple design the bulk of the rotor is operated warm and only the superconducting rotor coils are operated cold, and each is enclosed in its own small, rugged cryostat. This design is significantly more reliable than the traditional superconducting generator rotor designs in which the majority of the rotor structure is operated cold and is enclosed in a large cryostat which, for large diameter (4-5 meter) wind generator rotors, would require a 4-5 meter diameter cryostat. In embodiments of the present design, the only cold cryogenic components are small reliable rotor coils that can be produced in a factory, and fully tested before being installed on the rotor structural segments.

Rotor Coil Configuration

A novel rotor coil configuration was developed that minimizes the number of cryogenic rotor coils and therefore increases the reliability of the rotor. A standard rotor coil configuration would ordinarily be used for the rotor, where each rotor pole has a dedicated superconducting rotor coil that produces a magnetic field. Rotor poles alternate their magnetic orientation and superconducting rotor coils wound in opposite directions are placed on alternating rotor poles to provide the standard N-S-N-S magnetic field configuration.

In embodiments of the present design, we take advantage of the magnetic steel in the rotor to direct the magnetic fields onto the stator in the proper orientation. One can potentially excite every other rotor pole with superconducting coils oriented in the same direction. Instead of the traditional rotor configuration where each pole is excited by a superconducting coil containing "X" ampere-turns, we propose to excite only every other pole with superconducting coils each containing "2X" ampere-turns.

The result is alternating N-S magnetic poles with the same net amount of superconducting wire, but concentrated in ½ the number of coils and cryostats, as one slightly larger cryostat is mechanically superior to two smaller cryostats. This innovation simplifies the design of the generator, reduces its cost and significantly improves its reliability by reducing the number of cryogenic coils, cryostats, connections and piping by 50%. Essentially one coil feeds both its own north pole and the return fields from its neighboring south poles.

Electrical connections between MgB$_2$ coils may be made by a short cryogenic cables equipped with quick disconnects on both ends. These short connection cables may be conduction cooled (or by a liquid or gas cryogen) from one or both of the rotor coil cryostat and will consist of short lengths of high temperature superconductors (YBCO or BSCCO) mounted on a copper substrate. The temperature of this cable can rise to a temperature over the temperature being maintained in the two cryostats being joined by the cable and still carry the full-rated rotor excitation current with minimum losses. In the rare event of a rotor coil or cryostat failure, the quick disconnect cable can be easily removed to allow on-site replacement of superconducting rotor coil and cryostat, and then replaced once a new rotor coil and cryostat is installed.

Alternative Rotor Embodiments

Another advantage of this "one coil feeding a north and a south pole" configuration lies in the ability to continue to operate the generator even after the failure of a rotor coil. In traditional generators, the loss of any rotor pole coil would produce highly unbalanced magnetic fields linking the stator windings and would resulting in unbalanced stator output currents, excessive circulating currents and imbalanced magnetic forces that would require the entire generator be shut down immediately to avoid damage. Embodiments of the present generator are designed to function even in the event of a rotor coil failure, and possibly even two rotor coil failures. A unique stator winding (a wave winding) may be utilized in which each of the three stator phase windings links all rotor poles, and there are no parallel stator windings residing in different sectors of the machine. Most commercial generators operate at high speed and easily produce adequate output voltage. These machines commonly have multiple parallel windings within each phase that produce the same voltage at each instant when all rotor magnetic poles are functioning properly. They can therefore be connected in parallel to deliver large output currents. If a rotor coil or pair of coils fails in the traditional generator, each parallel winding produces different voltages at different times and the parallel windings cannot be connected together. In addition, different phases of the generator also produce unbalanced voltages and the entire generator must be immediately shut down until repairs can be made.

In the case of low speed wind generators, producing high output voltage is a problem and it is to one's advantage to operate all coils within each phase in series to produce the highest possible output, with no parallel windings to connect within a phase. Advantage may be taken of such a series winding to accommodate the possibility of a rotor field coil failure. A series winding spanning all rotor poles allows one to continue to operate the generator even in the event of a rotor coil failure. Since each stator phase winding links all poles of the generator, its output voltage is the sum of all the time-varying fields from all the rotor poles. With all poles functioning properly the generator induces three balanced phase voltages and the generator operates normally. In the case of a coil failure in the rotor (one coil exciting a N and a S pole), the failure effectively shuts down a N and S pole pair, and since each phase winding links all rotor poles, each winding continues to produce the same balanced output voltage.

The output voltage of the generator is reduced by the ratio of operating poles/total number of poles, but the machine can continue to operate, although at a slightly reduced output voltage. As an example only, and not by way of limitation, a 24 pole generator losing one rotor coil (one pair of rotor poles) will produce 22/24 or 91% of its output voltage at rated output current. If the generator step-up transformer is equipped with an automatic tap changer, the transformer can boost the generator output back to its normal output level and the generator can continue to function until repairs can be made. This is a great operational advantage and eliminates a common single point failure of superconducting generators, and greatly increases the reliability of these generators.

In certain embodiments, the rotor coil and iron configuration will be slightly reconfigured into a horseshoe configuration to assure that the time varying magnetic fields in the vicinity of the failed rotor coil electromagnetic remain normally distributed.

Superconducting Rotor Coil and Cryostat Design

Certain rotor design embodiments eliminate the traditional large, fragile cryostat and numerous cold components, and replaces them with a warm rotor structure and a series of small reliable vacuum insulated cryostats which enclose individual superconducting rotor coils located on ½ the rotor poles as seen well in FIGS. 8-11.

Each superconducting rotor coil (12 in total in some embodiments) contains, in some embodiments by way of example only and not limitation, a single 2,293 meter long piece of MgB$_2$ superconducting wire (27.5 km total per generator) operating at 20K-3T based on predicted 2014 2nd generation wire performance. When these generators are likely to be commercialized, the wire cost is projected to be only $25,000 ($1/meter), or about half of present costs. In some embodiments, fully saturated magnetic iron is used for most of the magnetic field path in order to minimize the amount of superconductor used in this machine. This would be extremely important if BSCCO or YBCO superconductor were used, as in other proposed machines, since these superconductors are extremely expensive, are not available in sufficient single piece lengths needed to eliminate numerous troublesome internal joints within each coil, and are not available in sufficient quantities to support the wind energy market. MgB$_2$, on the other hand, is available at prices approximately 10% that of YBCO, is available in very long single piece lengths (allowing the elimination of all superconducting joints within single pole coils), has recently demonstrated a technical improvement that will significantly increase its performance, and will be available in sufficient quantities to meet the needs of emerging MRI and wind generator markets.

Therefore, additional MgB$_2$ superconductors can be used to eliminate more of the iron in the machine and further reduce the total weight of the generator. Based on cost, performance and availability considerations MgB$_2$ is the only viable superconductor that can presently meet the technical and economic needs of large high power wind generators. In addition MgB$_2$ operates at 20K, which significantly reduces the technical complexity and requirements of cooling the conductors, as compared to 4-10 K needed for other low temperature superconductors.

In one embodiment, a quadrant of the outer rotor rim contains six magnetic poles and three superconducting rotor coils, each of which is enclosed in its own double-walled stainless steel vacuum-insulated cryostat. Aside from the MgB$_2$ coils located inside each cryostat, the rotor is operated at ambient temperature. Each cryostat vessel is attached to a laminated pole structure which in turn is attached to the solid rotor support rim via tapered dovetail joints that allow the iron pole/cryostat assembly to be easily attached to the support rim, as well as easily removed and replaced on-site should a problem develop with the coil assembly.

The MgB$_2$ coils may be wound around a central bobbin and then reacted to form a fully processed superconducting coil. The coil may then be vacuum pressure impregnated to fill all voids and to add strength to the coil and improve internal coil cooling. The completed coil may be then inserted in the inner cryostat assembly, which is then welded shut. The inner coil assembly is suspended and supported inside the outer vacuum jacket by an array of high strength, high thermal impedance aramid fiber ((KEVLAR®); E.I. du Pont de Nemours and Company, Delaware, USA) straps that thermally isolate the cryogenic coil assembly from the warm outer wall of the cryostat, while mechanically supporting the coils against the electromagnetic and centrifugal forces imposed upon it during operation. The outer wall of the cryostat must maintain structural integrity against atmospheric pressure and the reaction forces imposed by the KEVLAR® coil support straps.

A cold plate is embedded inside each inner cryostat wall adjacent to and in good thermal contact with the MgB$_2$ coils. The cold plate conducts heat from the superconducting coils and maintains the coils at or below 20K. The cold plate is cooled by cryogenic gas or liquid (helium, neon, or hydrogen) which is cooled by an external cryocooler and heat exchanger, passed onto the rotor through redundant long life mechanical and ferrofluid seals, circulated along the cold plate and returned to the cryocooler. Presently helium gas is used for the coolant, but based on work done at NASA, cryogenic hydrogen could also be a substitute for helium gas. Helium is becoming scarce and expensive, and is not a coolant that can be generated on-site in the event of very small system leaks. Hydrogen, on the other hand is inexpensive, readily available and can be produced on-site by several simple methods, such as a small electrolytic production system that can automatically replenish the cryogenic hydrogen coolant in the event of small leaks.

Cryogenic Cooling System

The MgB$_2$ rotor coils have negligible electrical losses but must be kept at 20K to function. The heat leak between the cryostat and ambient temperature will be designed to be 2 watts per cryostat or less for a 5MW generator. A 24 pole 12 cryostat superconducting rotor will therefore have a total heat leak of 24 watts from the cryostats and approximately 50 watts from the cryogenic current leads feeding the rotor coils and miscellaneous thermal losses in the remainder of the system. A preferred commercially available cryocooler for this system is the CRYOMECH™ A325 (Cryomech, Inc., Syracuse, N.Y. USA) that can deliver 70 watts of cooling at 20K and which has the ability to operate several degrees below 20K at a reduced capacity. Extensive thermal analysis will determine if a cooling system operating on a single cryocooler is feasible, but it is expected that an additional cryocooler will be provided for redundancy, and as many as three may be provided for double redundancy. Cryocooler reliability has improved dramatically during the past decade and commercially available coolers claim 10,000+ hours MTBF and generally deliver over 15,000 hours MTBF. The use of redundant cryocoolers should provide several years of reliable operation without replacing a cryocooler, and reliability figures are continuously improving. Assumption is made that preventative maintenance schedules will result in periodic routine replacement and refurbishing of cryocoolers and that this routine maintenance will not place unusual burdens on the operational cost of these generators.

In one embodiment two CRYOMECH™ A325 (Cryomech, Inc., Syracuse, N.Y. USA) cryocoolers cool the primary coolant (liquid helium), which in turn cools a secondary loop of gaseous helium (and potentially hydrogen if this is shown to be beneficial). This coolant is passed onto the rotor through rotating seals where it cools the individual coils via a cold plate embedded inside the cryostat and then returns to the external cryocooler heat exchanger. Rotating cryogenic seals have presented problems for high-speed equipment (1,800 rpm) but given the very low speed of generators (6 to 12 rpm) of proposed embodiments, many technologies exist that can be used to produce very reliable rotating seals with stationary lockup seals during periods when the generator is dormant. It is anticipated that adapting existing seal technology and adding redundant ferrofluid seals will produce a seal system that can meet commercial reliability standards.

Since most superconducting generators are presently also designed with all of the superconducting coils located inside a single large cryostat, any pinhole leak anywhere in the cryostat and the subsequent loss of vacuum insulation, immediately results in the loss of function of all superconducting coils and requires an immediate shutdown. Because of these factors designers had no incentive to develop methods to isolate defective superconducting coils and there were no alternatives but to immediately shut down the generator if a coil failure or cryostat leak developed.

As described above, embodiments of the current generator can function electromagnetically and mechanically with the loss of one, and possibly two, superconducting rotor coils or the individual cryostats that house them, but bypass hardware needs to be emplaced to thermally and electrically isolate any defective coils and cryostats from both the electrical and cooling systems. The small size of proposed cryostats makes them rugged and it is unlikely that a mechanical failure of a cryostat will occur, but the possibility of such a rare event must be considered. If a superconducting rotor coil fails and loses its superconducting properties, very high electrical losses will be generated that would be absorbed by the coolant flowing to that coil. The highly elevated coolant temperature would overwhelm the global cooling system resulting in a cascading failure of other coils and requiring a generator shutdown. If a cryostat failure occurred, the loss of vacuum insulation would result in a greatly increased heat leak to the ambient environment. This heat leak would cause greatly elevated coil temperatures, loss of coil superconductivity, excessive heat leaks from the ambient environment into the coolant entering the cryostat and would result in excessive coolant temperatures that again would cascade throughout the cooling system and require a generator shutdown.

In order to continue to operate with either the loss of a cryostat or the loss of a superconducting coil, one must provide systems to isolate the cryostat from the global cooling system and isolate a defective superconducting coil from the electrical system. When a defective cryostat is identified, cryogenic shutoff valves, which would most likely be simple electrically operated valves, in both the coolant inlet and coolant return line to each cryostat would be closed, preventing coolant from entering the cryostat through either cooling line. With these valves closed the cryostat/coil assembly would slowly approach ambient temperature, but would be isolated from the global cooling system. Small solenoid valves suitable for this application have been demonstrated but generally are connected to room temperature actuators resulting in an unacceptable one or two watt heat leak per valve. To solve this issue, a cryogenic valve and actuator mechanism that is enclosed in the cryostat and completely isolated from the warm environment could be used. A small integral electrically activated solenoid that would only be required to operate once would be enclosed within the cryostat; the entire defective assembly would be replaced during repairs. Such a system would thermally isolate a defective cryostat from the cooling system and allow the continued operation of the generator pending repairs.

Should a superconducting coil fail and lose its superconducting properties due to a quench or other damaging event, coil thermal losses would increase dramatically. These losses would be conducted into the cooling system through the superconducting coil electrical leads; local coolant temperatures would rise and be absorbed by the global cooling system, eventually overwhelming the cooling system. In the case of a coil failure one needs to isolate the associated cryostat as described above and also needs to physically disconnect the defective coil from adjacent coils, which are connected in series, to prevent the elevated temperature of the defective coil from conducting heat into the electrical jumpers connecting rotor coils and causing a cascading electrical failure. One would also need to bypass the excitation current around the coil through a low loss, potentially superconducting, jumper that would allow the continuous feed of excitation current to the remaining rotor coils.

One embodiment includes both disconnect and bypass functions. During normal operation the incoming excitation current passes directly into the superconducting coil, exits through a superconducting lead and continues on to the next rotor coil. Should a rotor coil failure be detected, some form of mechanical interrupt must physically disconnect both rotor coil leads, and then bypass the excitation current through a superconducting jumper to the remaining rotor coils. This type of basic scheme is often used to protect large accelerator magnet coils by placing a diode in parallel with the coil. When the coil is operating normally the voltage drop across the coil is zero and the forward voltage drop of the diode prevents current from flowing through the diode. Should the coil fail or quench, the voltage drop increases, exceeds the forward drop of the diode, which then bypasses the current around the coil.

This same type of solid-state bypass system would work to protect suggested embodiments of the coils, but as the generator continues to operate the required, example—200 Amp rotor, coil excitation would continue to flow through the bypass diode with its 0.7V forward drop and produce 140 watts of heat. This high heat generation would cascade into the coolant and adjacent superconductors resulting in high losses, which would overwhelm the cooling system and require a generator shutdown. A "one shot" mechanical switch will be needed that mechanically breaks the electrical connections with the defective rotor coil and engages the superconducting jumper. Such a mechanical switch would electrically and thermally disconnect and isolate the defective coil from the rest of the system and bypass the excitation current through a superconducting jumper; all with minimum losses that would allow the cooling system to maintain the superconducting properties of the excitation current path.

Stator Design

The stator design could be a superconducting design but can also be a relatively conventional commercial stator design consisting of a laminated iron core with teeth that will house and support the three-phase electrical stator winding. The iron is operated fully saturated to reduce the weight of the generator. The laminated back iron and teeth provide mechanical support for the stator and conductors. Reducing the cross-sectional area of the laminations is not mechanically practical in this high torque machine. The very high torque in the low speed machines makes it desirable to enclose stator conductors within iron slots, which support the conductors and also take the full torque of the generator. Large electromagnetic forces are not applied directly to the conductors. Increasing the number of superconducting turns in each rotor and operating the iron oversaturated is one option, which will allow builders to shorten and lighten the generator while maintaining the power output and trading superconducting cost vs. generator weight.

The stator winding will be a traditional, and well-proven, liquid (oil or EGW) cooled stranded copper winding enclosed in thin groundwall insulation. In one embodiment, cooling liquid flows through the hollow copper strands embedded in the coil and enters and leaves each coil through a simple manifold brazed onto the ends of each coil.

As described earlier, each phase of the three-phase stator winding consists of a single series winding that links all poles of the rotor. This allows the generator to produce the highest possible output voltage and also provides the unique capability of operating the generator even with the loss of a rotor coil as described above.

Generator Modular Design

Traditionally designed non-superconducting multi-megawatt direct drive generators are large, heavy and difficult to transport to remote installation sites with existing transportation systems, often requiring modifications of roads, bridges, power lines, etc. Once a non-superconducting generator arrives on-site, lifting it to the top of a tall tower will also be a difficult and expensive process, requiring large cranes, or potentially exceeding the capacity of existing cranes and therefore limiting the maximum power rating of wind platforms. The low speed of direct drive generators will drive their design to large diameters (5-8 meters) regardless of the technology used, but the weight of traditional iron-based non-superconducting generators will quickly become excessive as power requirements increase and the commercialization of 5-20 MW direct drive generators will require superconducting technology to reduce their weight.

There are very significant advantages from reducing not only the total weight of the generator (impact on tower requirements), but from reducing the maximum size and weight of shipped and installed components (impact on transportation and installation costs). Accordingly, a key feature of the embodiments of the present design is the ability to break both the rotor and stator into small, lightweight modules that can be easily transported by readily available trucks along existing roads without requiring expensive alterations to roads, bridges and existing infrastructure. In addition, the small lightweight modules can be individually lifted atop tall towers and then assembled into a complete generator, significantly reducing the required lifting capability of cranes and allowing the installation of higher power generators atop taller towers.

The modular features of embodiments of the present design may be required to meet the increased power levels projected for future wind systems. Although traditional iron-based generators can also be broken into small transportable modules, the total weight of the assembled generator is too heavy for the towers needed for high power (5+MW) wind energy systems. Lightweight superconducting generators will be required to reduce the total weight of generators to acceptable levels. However, all other superconducting generators now under development use topologies, such as large cryostats, that will not allow these generators to be broken into small modules for shipping and installation, and they will therefore suffer significant shipping and installation limitations. The proposed generator is the only superconducting generator topology specifically designed for minimum weight and modularity that allows practical shipping and installation—a potentially enabling topology for high power systems.

TABLE 1

Modular Design of a 5 MW Superconducting Generator.

| Component | Weights (Tons) | Dimensions (L × W × D)(feet) |
|---|---|---|
| Fully Assembled Generator | 76.49 | Axial Length = 9.4' Diameter = 16.1' |
| Rotor Shaft | 2.73 | 15' × 2.5' × 2.5' |
| Rotor Support Struts | .05 | 8.8' × 3.2' × 0.13' |
| Assembled Rotor Shaft/ Support Struts | 5.13 | 15.1' × 12.2' × 12.2' |
| Rotor Quadrants | 2.71 | 9.4' × 3.4' × 2.4' |
| Stator Quadrants | 13.68 | 11.4' × 3.3' × 5.4' |
| End Brackets | 1.45 | 116.1' × 1.0' × 8.1' |

Table 1 shows a summary of an embodiment of a completely assembled generator and the small lightweight modules that will be used to construct it. While the complete generator weighs 76.5 tons and is 16 ft. in diameter by 9.3 ft. in length, the heaviest individual module weighs just 13.7 tons and measures 11.4 ft. by 3.3 ft. by 5.4 ft. The largest dimension of any piece (the bearing brackets) measures 16.1 ft. by 1.0 ft. by 8.1 ft. and weighs 1.45 tons.

The heaviest and the largest modules can be easily transported to remote sites by readily available transportation equipment without reinforcing or modifying roads, bridges, or other infrastructure elements. The heaviest piece is 14 tons (18% of the weight of the complete generator) and less than 11% the weight of a conventional 5 MW non-superconducting generator. The crane capacity required to install the modules atop the tower is also dramatically reduced. Modularizing the generator provides extremely significant benefits and the modular concept will become increasingly important as power ratings increase to 10-20 MW for large land based and offshore systems.

FIGS. 1-11 and 15-18 show basic modular components that make up one embodiment of the proposed generator. In one design the rotor and stator modules are made by dividing both the rotor and stator into four quadrants that can be assembled atop the tower. This number is somewhat arbitrary and can be increased or decreased as desired. If large crane capacities are available, the rotor and stator could, for example, be built as two modules each spanning 180 degrees of the generator. The rotor shaft and support structure are composed of a central shaft and numerous lightweight compact support struts to facilitate shipping since the overall diameter of the fully assembled shaft and rotor structure is over 15 ft. If this size is not a problem the shaft and support structure could be assembled at the factory and shipped as a unit. The 48 rotor support struts could be combined as a 24 full-diameter strut assemblies, 8 half circle struts or 4 full-diameter struts to minimize on-site assembly.

Figure 2:
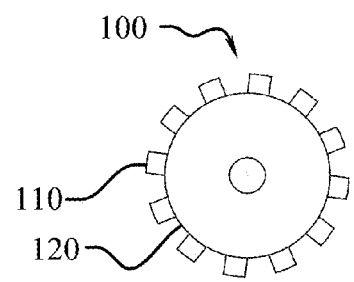
FIG. 2 shows an end view embodiment of a rotor shaft
Figure 3:
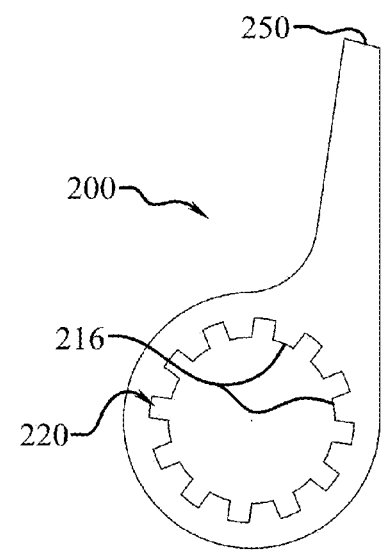
FIG. 3 shows a face view of a torque strut.
Figure 7:
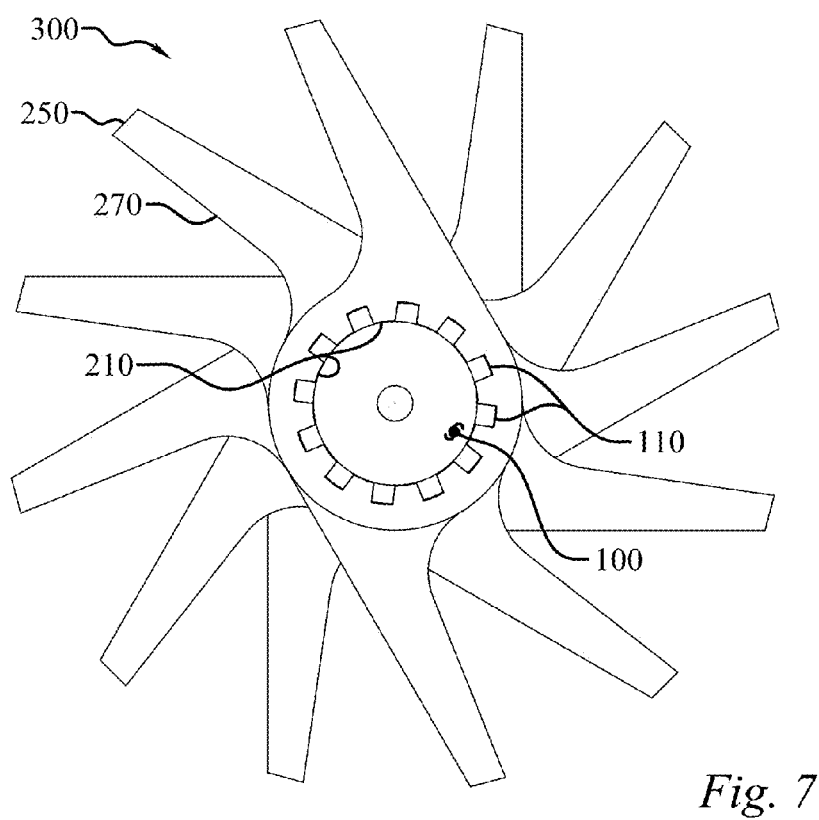
FIG. 7 shows a plurality of over-lapped torque struts mounted on a rotor shaft.
Figure 10:
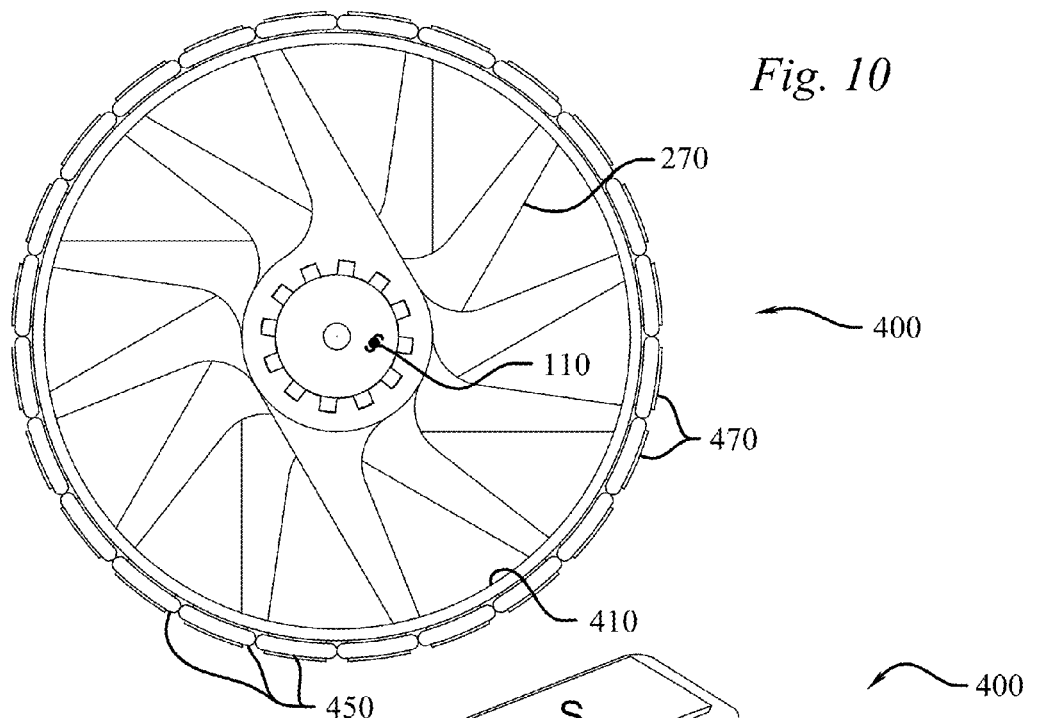
FIG. 10 shows details of a rotor surface consistent with the present invention, and showing associated rotor coils, some of which are enclosed in cryostats.

When the modules arrive at the installation site the assembly process proceeds as described below. FIGS. 1-8 show the components that form the central rotor support structure consisting of a central shaft, seen well in FIGS. 1-2, and between 48 and 4 strut assemblies as described above, as seen well in FIGS. 3-8. If the shaft and struts are shipped to the site pre-assembled the entire unit will be later lifted to the top of the tower and installed in the generator. If the assembly arrives in pieces it will be assembled on the ground then lifted onto the tower.

The stator may be the first part of the modular generator to be installed on the tower and is formed from modular sections, which are installed atop the tower into a generator mounting bracket. The most likely configuration for the stator modules is 4 quadrants, but if weight permits, the stator can be delivered to the installation site and installed in two halves. Stator coils that span the stator sector interfaces are designed to be electrically connected in dedicated terminal boxes by either bolted joints or simple brazed joints normally used to connect all coils in the factory. In either case the connection process is relatively easy and does not present any major engineering or economic issues.

Next the lower bearing brackets/support assemblies may installed onto the generator mounting bracket and stator sectors, and the rotor shaft and support structure assembly then installed into the lower bearing/support brackets.

The rotor quadrants may then be installed onto the rotor support structure and electrical and coolant connections are made via quick disconnect fittings, as seen well in FIGS. 14-14C, 17 and 18. Finally the remaining stator quadrants or sectors may be installed, as seen well in FIGS. 17-18, and connections are made between appropriate stator coils to complete the stator assembly. The upper bearing/support brackets are then installed to complete the assembly of the generator.

Figure 18:
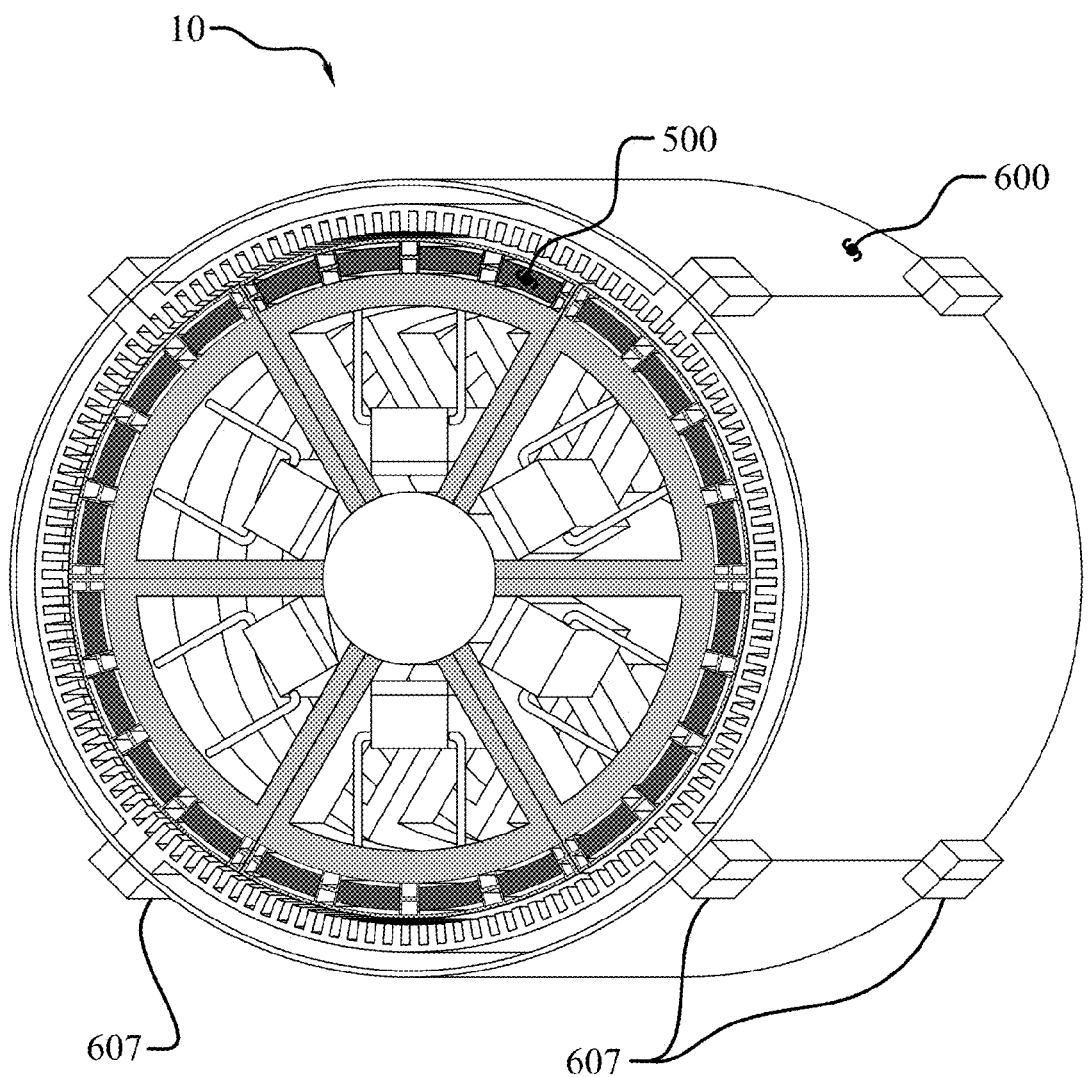
FIG. 18 shows an assembled rotor and stator consistent with the present invention.

FIG. 18 shows a completed generator. The unique modular design makes the transportation and installation of large 5-20 MW direct drive generators significantly easier and may in fact prove to be an enabling technology for 5-20 MW high power wind energy systems for both land based and offshore wind energy systems.

There is another very significant benefit to the modular design. The proposed generator is designed to be quickly and economically repaired on-site without removing it from the tower. The most likely component of the generator to fail is part of the cryogenic rotor system, and although the design has eliminated the traditional fragile and unreliable components, and stresses high reliability, there is always a chance of a component failure. The modular design is specifically designed to accommodate on-site repairs.

Other superconducting generators now under development have topologies that do not allow on-site access to critical components, usually superconducting components contained within large cryostats. On-site repairs are therefore not practical and repairs require that the complete generator be removed from the tower and returned to a repair facility, a very long and very costly process.

With the proposed generator design, if a small cryostat or superconducting coil failure occurs, one could continue to operate the generator pending normal maintenance or repairs. These components are also specifically designed for easy access and replacement on-site. In order to gain access to the rotor one could, in a worst case scenario, remove the top bearing bracket on one end of the generator. Alternatively, the bearing bracket would be designed with a small easily removable access hatch that would allow repair personnel to gain access to defective cryogenic rotor components. The poles and cryostat assemblies are attached to the rotor support rim via single or double tapered dovetail joints that allow them to be easily removed from the rotor. Once the defective coil/cryostat assembly is removed it would simply be replaced by a spare assembly, reconnected to cooling and electrical systems via quick disconnect fittings, the access hatch reinstalled and the generator would be returned to service. For larger repairs the removal of the top bearing support bracket provides access to all rotor and stator components. A major benefit of the proposed design is that small components can be replaced without removing the generator from the platform. Since the machine components are relatively small, lightweight and interchangeable, wind farm operators and manufacturers can reduce the size of replacement part inventories and system operators can elect to stock a small number of replacement parts.

For some superconducting applications, for example large rotor and stator coils for motors and generators, it is beneficial to place each individual coil or a group of coils in separate cryostats for cooling. However, for these types of applications it is necessary to have electrical currents running in series between two or more cryostats via connecting cables. These connecting cables have reduced heat loss if they are maintained at cryogenic temperatures and use superconductors to pass the electrical current. These connection cables that have superconducting electrical currents flowing through them can be cooled by a cryogenic liquid, a cryogenic gas or by conduction cooling from one or more of the cryostats with superconducting coils.

For a conduction cooling method, a superconducting cable may be cooled by conduction with the cryogenic conduction cooling coming from one or both of the coil cryostats. The cable temperature is equal to or greater than the lowest temperature cryogenic-cooled coil cryostat. Most types of superconductors can be used for carrying the electrical current, and most normal conductive metals can be used for the conduction cooling of the cable.

For using cryogenic liquid or gas, in some embodiments, the cryogenic liquid or gas can flow in the cable from one or both cryostats and back into one or both cryostats. Again the cable temperature will be equal to or greater than the lowest temperature coil cryostat.

In some embodiments, then, a modular superconducting electrical generator (10), or equally a superconducting electrical motor, is seen having a central rotor shaft (100), as seen in FIGS. 1-2 with a plurality of rotor shaft splines (110) and rotor shaft inter-spline spaces (120). These may form a combined structure with a plurality of torque struts (200), seen singularly in FIG. 3, having torque shaft splines (210) and torque shaft inter-spline spaces (220). The rotor shaft splines (110) may interact with the torque strut inter-spline spaces (220) and the rotor shaft inter-spline spaces (120) may interact with the torque strut splines (210) to maintain the rotor shaft (100) and each of the plurality of torque struts (200) in a predetermined relative position. However one skilled in the art will realize that many other joining systems are possible to hold the rotor shaft (100) and torque struts (200) in a predetermined position relative to each other. Various view of the assembly process and eventual appearance of the combined rotor shaft and torque strut assemblies may be seen in FIGS. 4-8.

Figure 12:
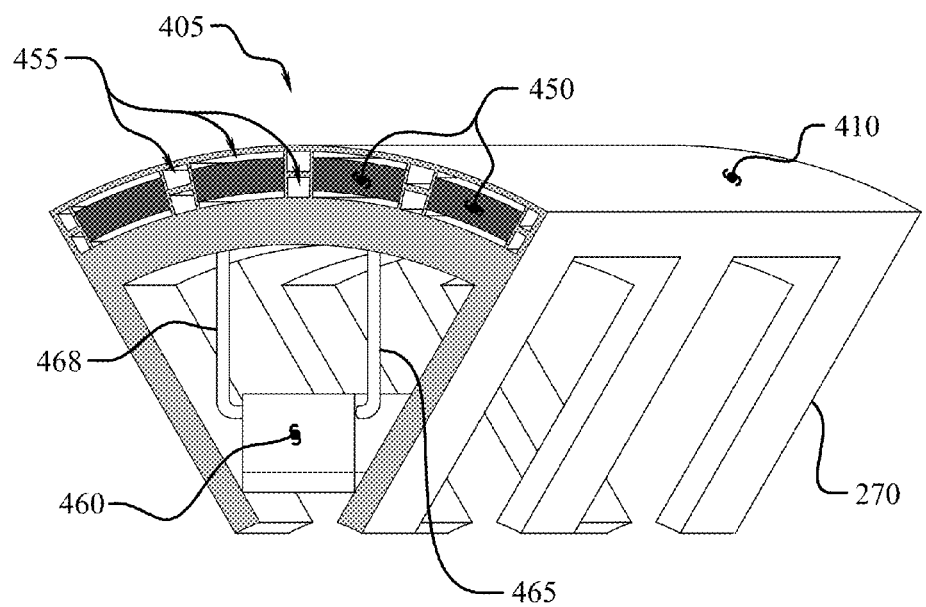
FIG. 12 shows detail of a rotor coil segment.
Figure 13:
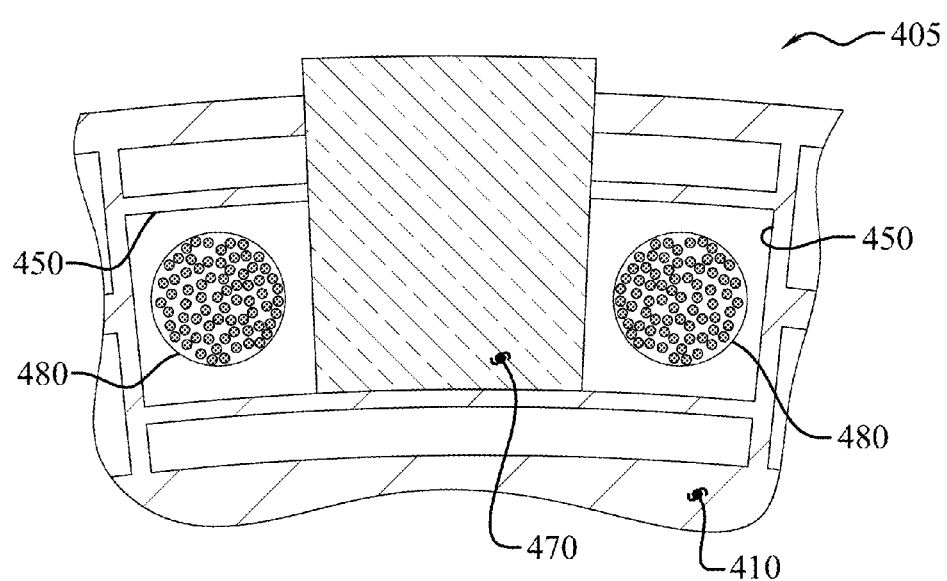
FIG. 13 shows a transverse cross-section of part of a rotor coil segment enclosed in a cryostat.
Figure 16:
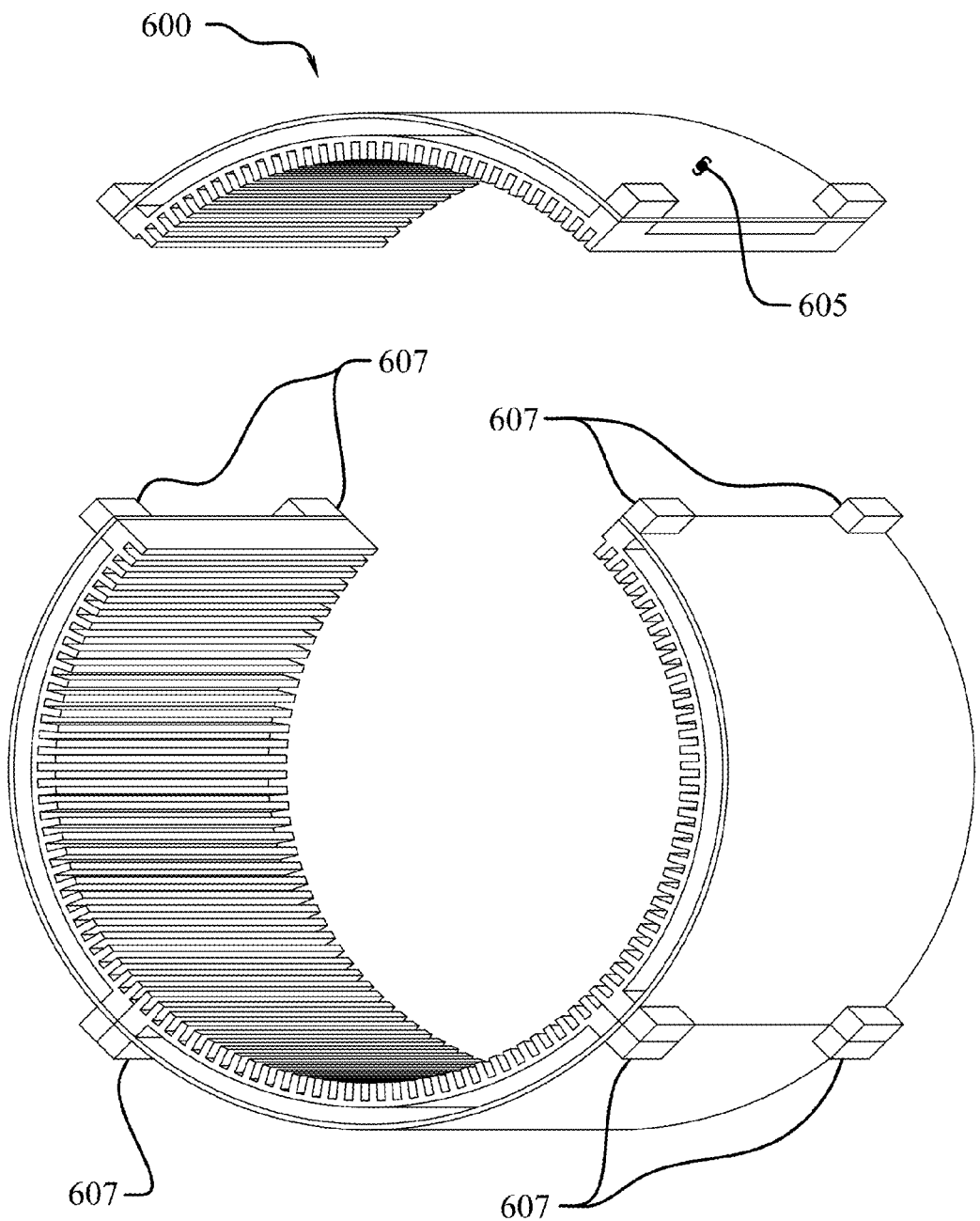
FIG. 16 shows a partially exploded view of a stator assembled from a plurality of stator segments.
Figure 17:
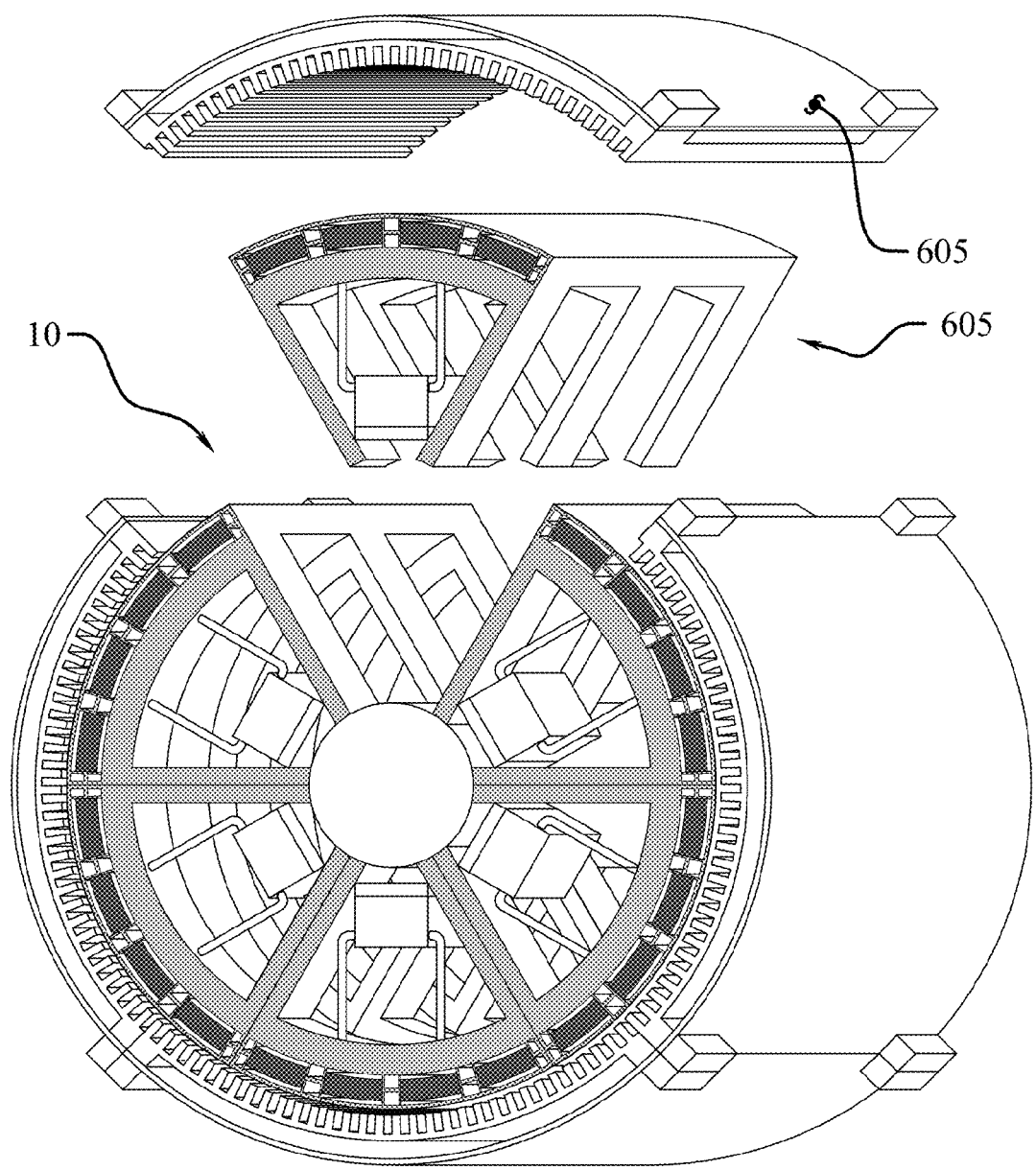
FIG. 17 shows a partially exploded view of a rotor assembled from a plurality of rotor coil segments combined with a partially exploded view of a stator assembled from a plurality of stator segments, illustrating the eventual position of the rotor within the stator.

The generator (10) may have a rotor (400) formed by a plurality of separable and adjacent rotor coil segments (405), seen in FIG. 12-13, attached to the central rotor shaft (100) with coils (480) in continuous electrical communication with adjoining coils (480) at a rotor rim (410), as seen in FIGS. 8-9. Furthermore, the generator includes a stator (600). In some embodiment, the stator (600) is formed by a plurality of adjacent and separable stator segments (605) in continuous electrical communication with adjoining stator segments (605) by means of stator segment connectors (607), as seen in FIGS. 16-18. In some embodiments, the provision of a wave winding in the stator (600) enables the generator to remain functioning even if some coils (480) fail.

In certain embodiments, at least one of the stator segments (605) is conventional copper coil or superconducting coil. In those embodiments including a stator (600) formed with separate stator segments (605); either none or all of the stator segments may be superconducting.

Figure 11:
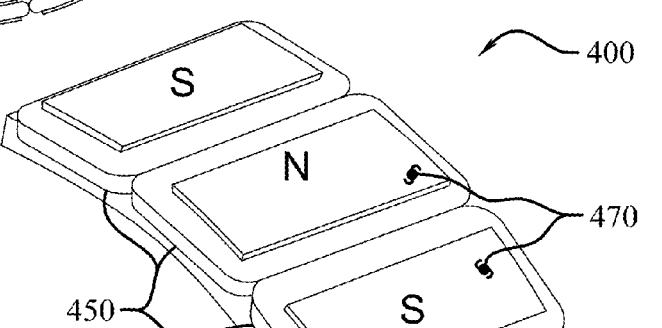
FIG. 11 shows details of a rotor surface consistent with the present invention, and showing associated rotor coils, all of which are enclosed in a cryostat

In others, all of the coils (480) may be superconducting and all of the coils (480) may superconduct; with some examples seen in FIGS. 9-12. At least one stator (600) may have a wave winding. FIG. 11 shows a possible embodiment of a segment of a superconducting rotor according to previous technology. Each iron rotor pole piece (470) is wound with a coil (480), and each coil (480) is contained within its own separate cryostat. Accordingly, in a rotor having 24 coils (480) 24 separate and independent cryostats (450) would exist.

Due to the enhanced current density enabled by superconduction, an alternate technology enable by the present invention is seen in FIG. 9. As seen, the high current density due to superconduction enables every other rotor pole piece (470) in an iron pole (470) generator to be wound with a superconducting coil (480) contained within a cryostat (450), thereby having each coil (480) drive two poles (470), halving the number of separate cryostats (450) employed. This has obvious benefits in decreasing the number of cyrostats needed.

Further development is required to allow this "every other pole" rotor system to perform with air-core rotors (400), as opposed to iron pole (470) pole pieces. This has obvious benefits in decreasing the number of cryostats needed.

As to coils (480), in some embodiments, all of the plurality of superconducting coils (480) have the same electrical polarity. In yet others, at least one superconducting coil (480) comprises a superconductor selected from the group of superconductors consisting of magnesium diboride ($MgB_2$), yttrium barium copper oxide (YBCO), bismuth strontium calcium copper oxide (BSSCO), niobium-titanium (NbTi), and triniobium-tin ($Nb_3Sn$), or any other type of superconductor.

Figure 14:
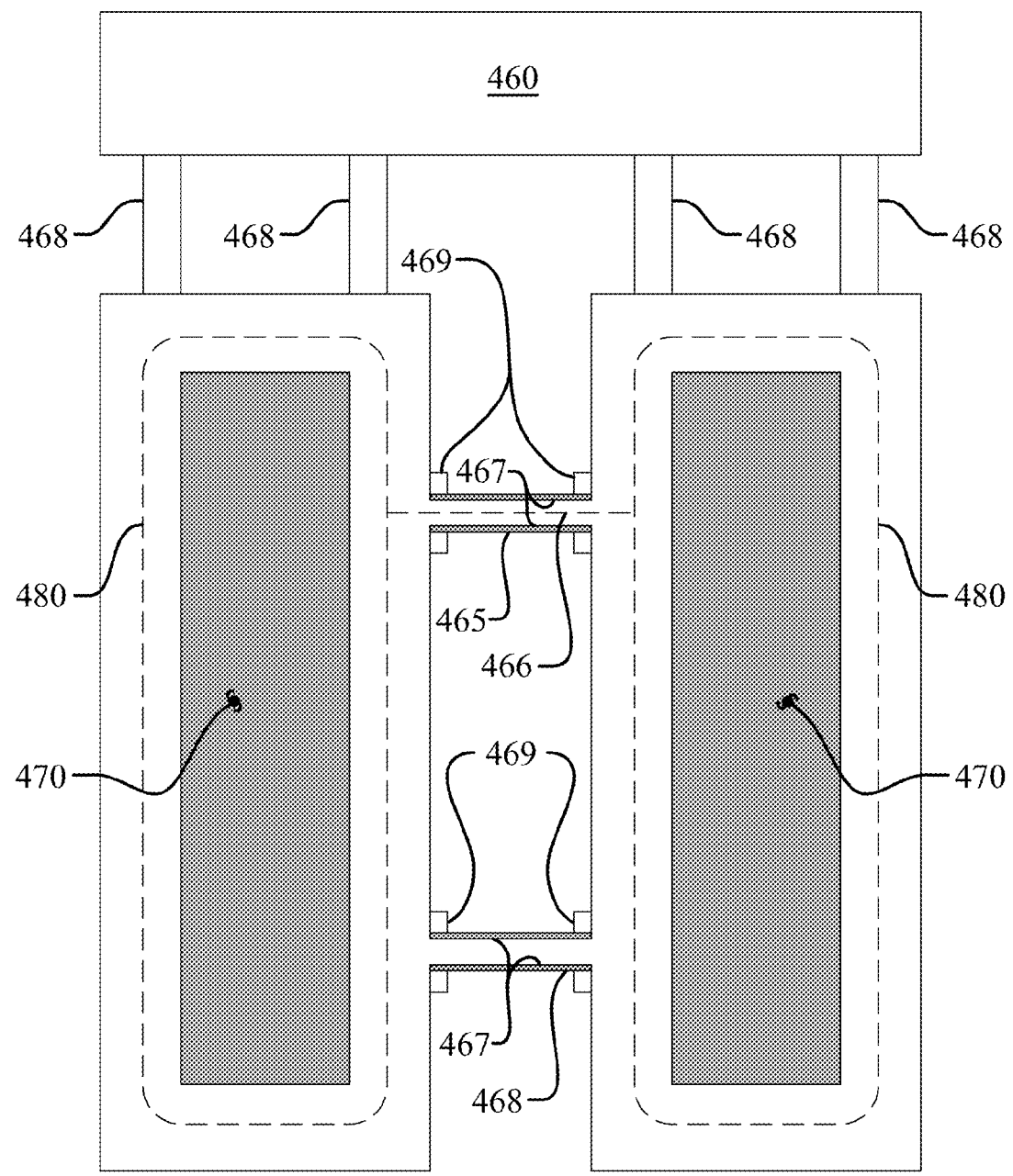
FIG. 14 shows a longitudinal cross-section of part of a rotor coil segment enclosed in a cryostat wherein coolant may circulate between adjacent cryostats to maintain cooling of a conduction cooling cable.

As to the production and maintenance of superconductivity, in some embodiments, at least one superconducting coil (480) is encased in a cryostat (450) in fluid communication with a rotor segment cryocooler (460) circulating a fluid cryogen through cooling channels (468) that may interconnect multiple cryostats, as seen in FIGS. 12-14. In further embodiments, at least two of the cryostats (450) are in thermal communication through a superconducting cryogenically cooled cable (465). All or some of these cryogenically cooled cables (465) may be superinsulated and cooled by conduction alone from an adjacent superconducting rotor coil cryostat (450), as seen in FIG. 14C, or all or some of these cryogenically cooled cables (465) may be cooled by flowing through the cable liquid or gas cryogen from a rotor coil cryostat (450), seen well in FIGS. 14-14B.

As to materials employed, in some embodiments at least one of the superconducting cryogenically cooled cable (465) may include a conductive metal from a group of metal conductors consisting of copper (Cu), silver (Ag), aluminum (Al), palladium (Pd), and platinum (Pt) or their alloys. In other embodiments, at least one of the superconducting cryogenically cooled cables (465) includes a high temperature superconducting material selected from the group of high temperature superconducting materials consisting of magnesium diboride ($MgB_2$), yttrium barium copper oxide (YBCO), and bismuth strontium calcium copper oxide (BSSCO), or other types of high temperature superconductors.

Various combinations of the above-taught materials and methods would be recognized by one skilled in the art. At least one superconducting coil (480) may exist as at least two superconducting rotor coil (480) segments, each insulated from an ambient atmosphere by inclusion in separate cryogenically cooled cryostats (450). Each cryostat (450) may be cryogenically connected to at least one other cryostat (450) through at least one cryogenic cable (465), as seen in FIG. 14. As referenced above, the present invention enables one cryogenically cooled superconducting coil (480) to drive two iron poles (470), i.e., the pole (470) of the superconducting coil (480) and an adjacent pole (470). Accordingly, there is a massive reduction in the complexity of rotor (400) hardware.

What is claimed then, is a superconducting electrical generator (10), and by necessary inclusion a superconducting electrical motor, having a plurality of cryostats (450) comprising at least a first cryostat (450) and a second cryostat (450). The cryostats (450) contain coolant and the first cryostat (450) encloses at least one of a plurality of superconducting coils (480). At least a first coil (480) is in superconducting electrical communication with a second coil (480) contained in the second cryostat (450) through at least one superconducting conduction cooling cable (465) enclosing a conductor (466).

In another embodiment, seen well in FIG. 14, the first cryostat (450) and the second cryostat (450) enclosing superconducting coils (480) may be in fluid communication through at least one cryogen channel (468) within the at least one superconducting conduction cooling cable (465).

Figure 14A:
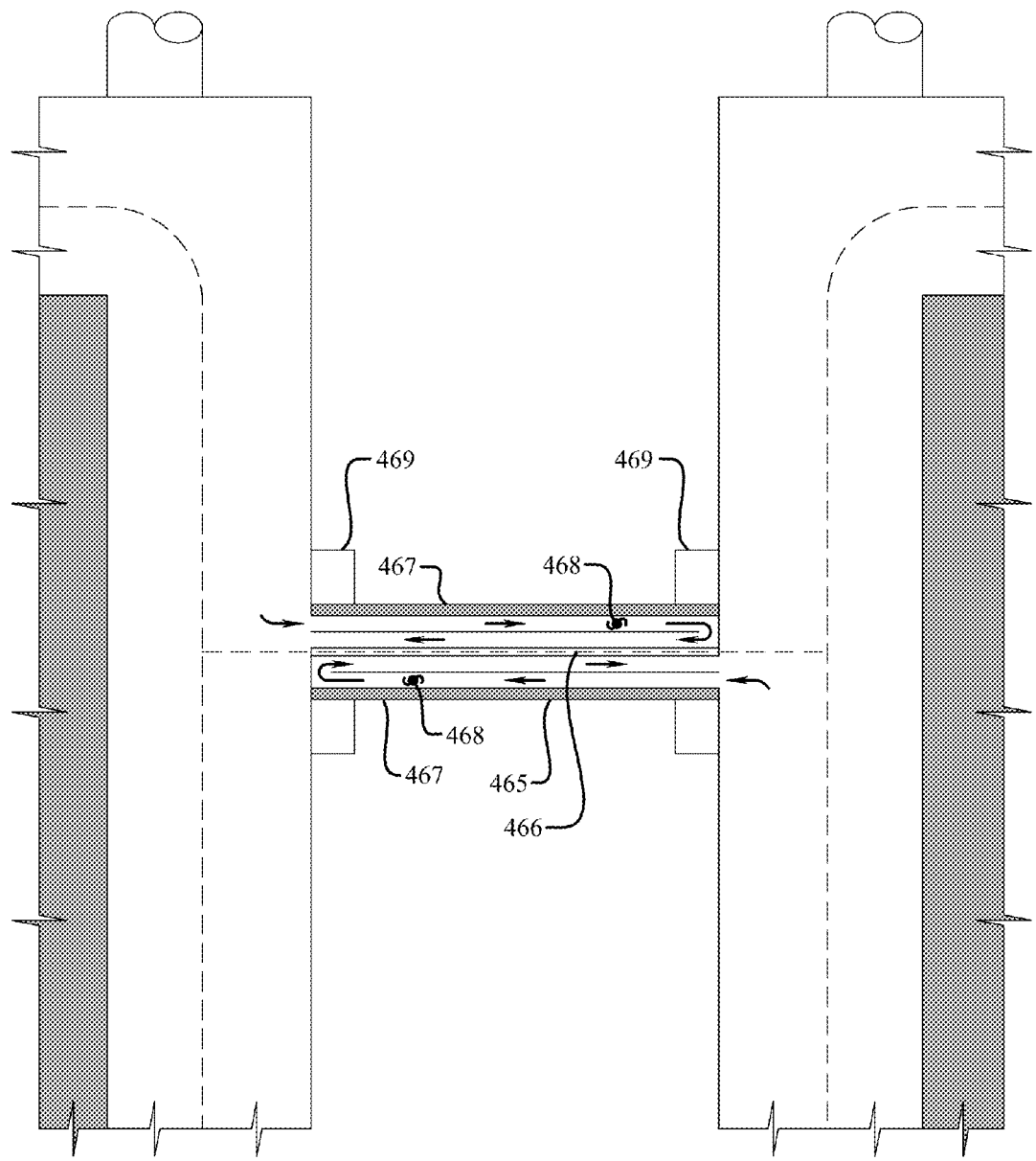
FIG. 14A shows a longitudinal cross-section of part of a rotor coil segment enclosed in a cryostat wherein coolant may circulate along a conduction cooling cable without circulating between adjacent cryostats, with arrows showing possible coolant flow direction.
Figure 14B:
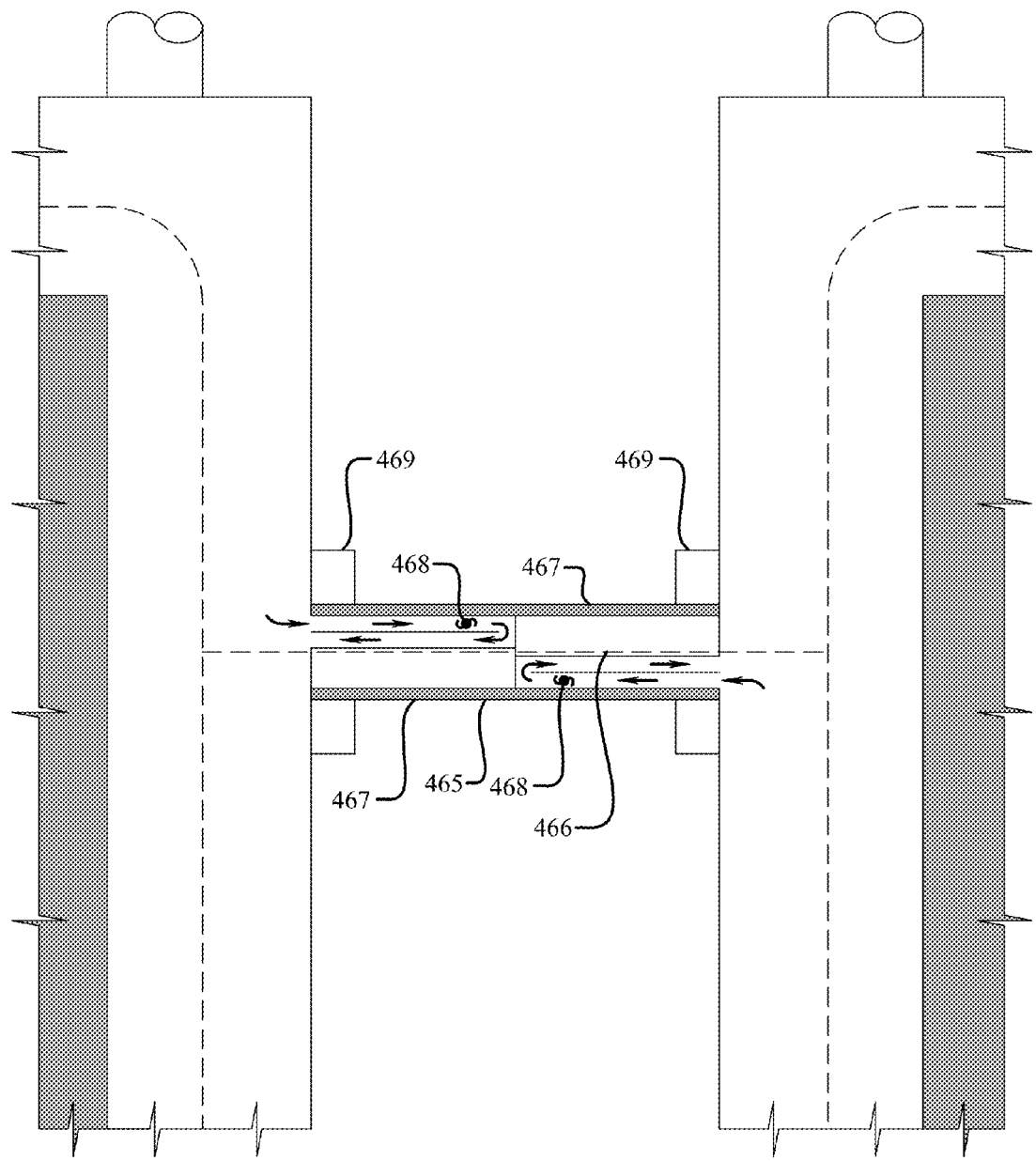
FIG. 14B shows a longitudinal cross-section of another embodiment of part of a rotor coil segment enclosed in a cryostat wherein coolant may circulate along a conduction cooling cable without circulating between adjacent cryostats, with arrows showing possible coolant flow direction.
Figure 14C:
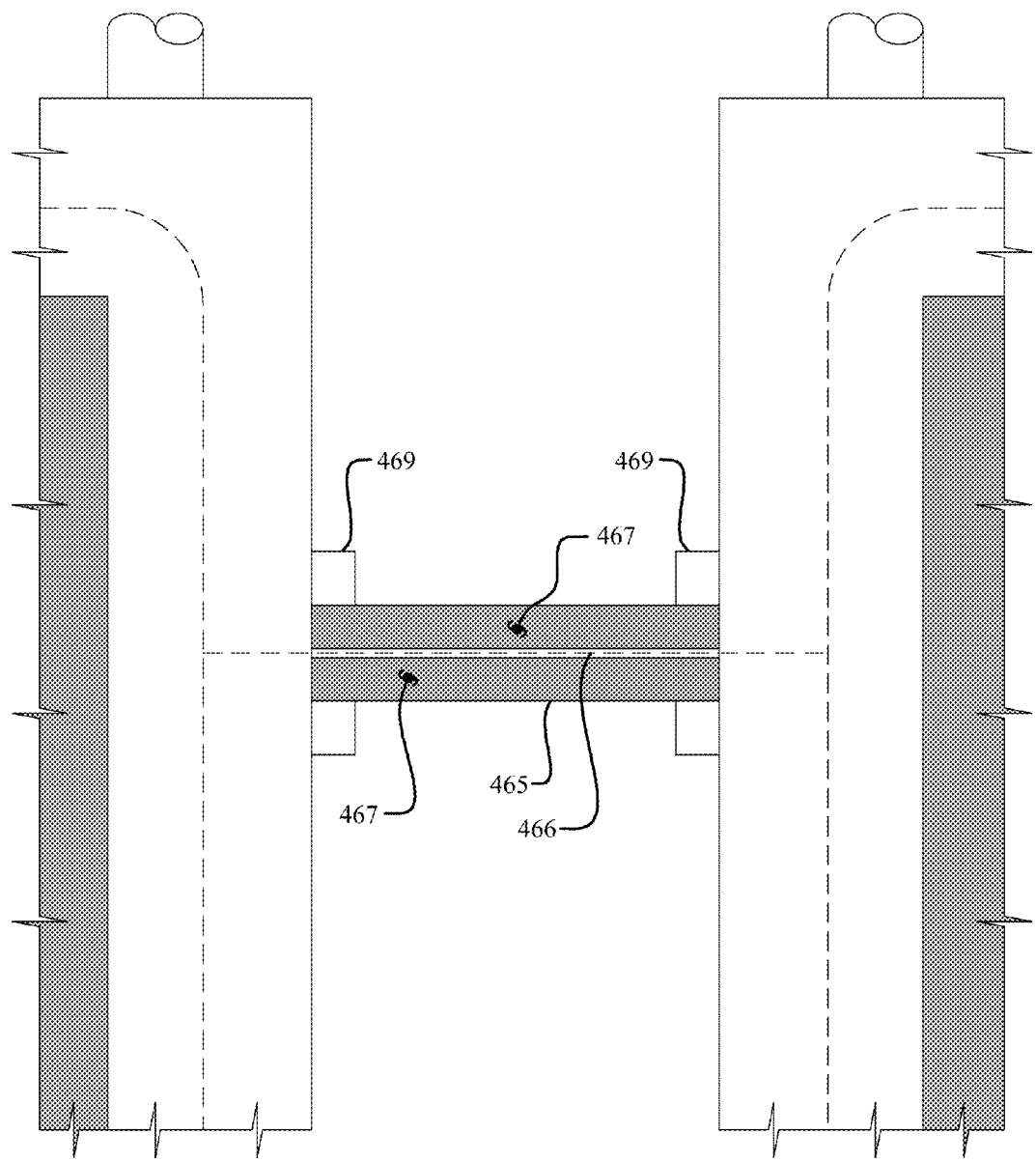
FIG. 14C shows a longitudinal cross-section of part of a rotor coil segment enclosed in a cryostat wherein coolant does not circulate along a conduction cooling cable, the conduction cooling cable being maintained at operating temperature by conduction through the cable, each end of which is immersed in an adjacent cryostats.
Figure 15:
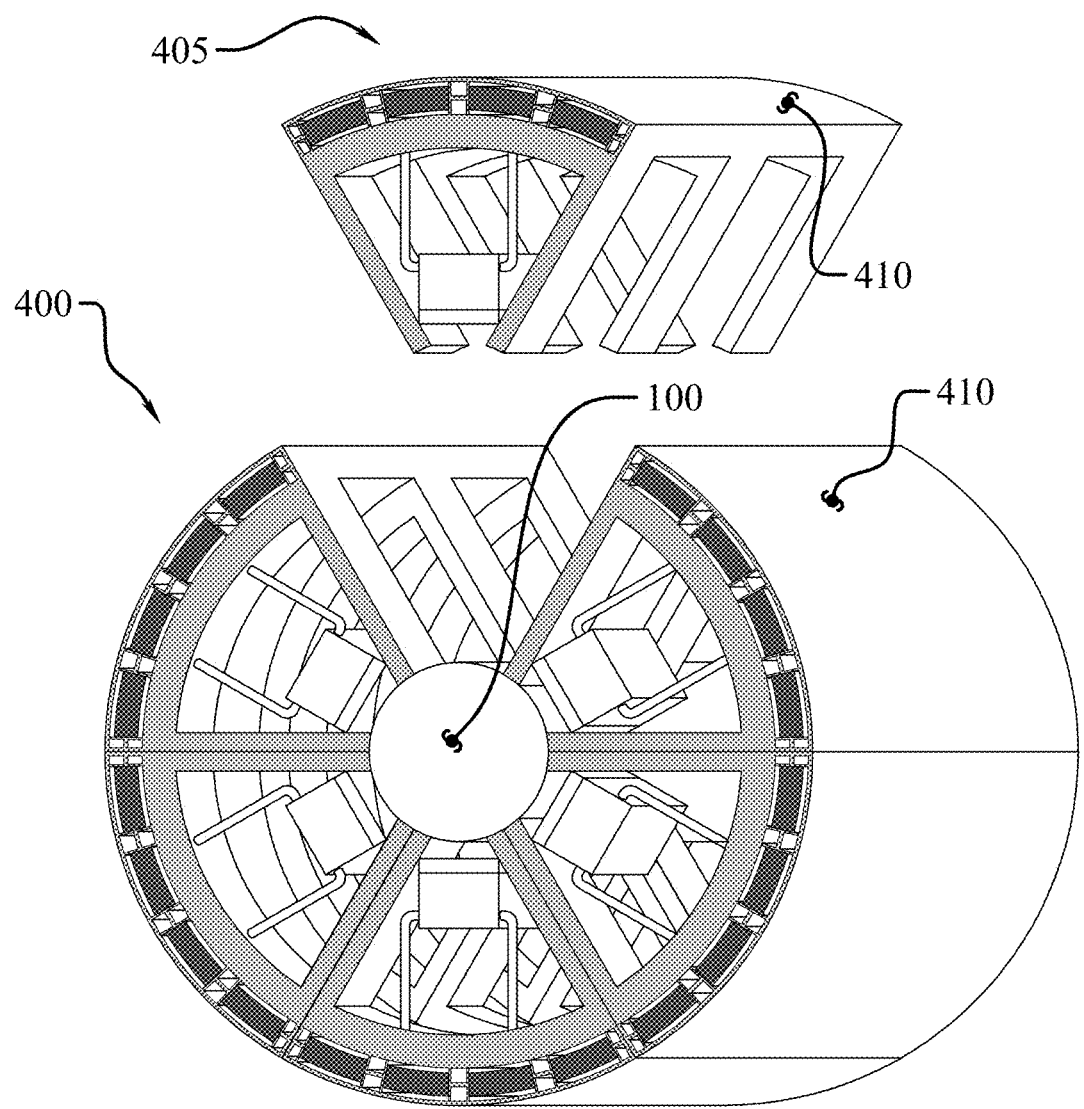
FIG. 15 shows a partially exploded view of a rotor assembled from a plurality of rotor coil segments.

In some embodiments, seen well in FIG. 14A, the superconducting conduction cooling cable (465) may be in fluid communication with the first cryostat (450) through at least one cryogen channel (468) within the cable (465). The conductor (466) may be cooled below ambient temperature by the circulation of coolant from the cryostat (450) within the at least one cryogen channel (468) within the cable (465). As seen in FIG. 14A, arrows show possible directions of flow from the cryostat (450) within the cryogen channel (468). As seen in FIG. 14B, the cryogen channel may pass variable distances along the cable (465) and the cable (465) may be provided with suitable amounts and types of insulation (467).

In yet another embodiment, seen well in FIG. 14C, none of the plurality of cryostats (450) may be in fluid communication with the at least one superconducting conduction cooling cable (465) and the cable (465) is cooled by conduction along the conductor (466) from at least the first cryostat (450) and the second cryostat (450).

The conductor (466) may have at least a first segment maintained at a temperature higher than of the coolant of the first cryostat (450) and a second segment maintained at a temperature intermediate between the temperature of the first segment and the temperature of the coolant within the cryostat (450).

As to materials, in some embodiments, at least one of the conductors (466) includes a conductor selected from the group of conductors consisting of copper (Cu), silver (Ag), aluminum, (Al), palladium (Pd), and platinum (Pt), and mixtures thereof. Similarly, in other embodiments, at least one of the conductors (466) may include a superconductor material selected from the group of superconductors consisting of magnesium diboride ($MgB_2$), yttrium barium copper oxide (YBCO), bismuth strontium calcium copper oxide (BSSCO), niobium-titanium (NbTi), and triniobium-tin ($Nb_3Sn$), other types of high temperature superconductors and mixtures thereof.

As to construction, in some embodiments, the at least one superconducting conduction cooling cables (465) may be connected to the cryostat (450) through at least one quick connect fitting (469). As before, in this specification, each use of the term "generator(s)" is defined to include "motor(s)," and each use of the term "rotor coil(s)" shall be deemed to include "stator coil(s)." In some embodiments, the plurality of superconducting coils (480) consists of superconducting coils (480) selected from the group of superconducting coils (480) consisting of rotor coils, stator coils, and mixtures thereof. The use of one or more superconducting coils in cryostats that are in electrical and cryogenic communication with each other using at least one superconducting conduction cooling cable is applicable to superconducting generators described in this application. It is also applicable to the electrical and cryogenic cooling between two MRI coils in cryostats used for image guided MRI applications, and for the connection between two superconducting coils in cryostats for induction type superconducting fault current limiter applications. In all cases, when the term "generator" is used in this specification, it is specifically intended to encompass "motors," "Magnetic resonance imaging devices," "fault current limiters," and the like.

In yet another series of embodiments, a superconducting electrical generator (10) (or motor) may include a plurality of cryostats (450) comprising at least a first cryostat (450) and a second cryostat (450). These cryostats contain coolant wherein the first cryostat (450) encloses at least one of a plurality of superconducting coils (480), and a first coil (480) is in superconducting electrical communication with a second coil (480) contained in the second cryostat (450) through at least superconducting conduction cooling cable (465) enclosing a conductor (466). The superconducting conduction cooling cable (465) may be in fluid communication with the first cryostat (450) through at least one cryogen channel (468) within the cable (465) and the conductor (466) is cooled below ambient temperature by the circulation of coolant from the cryostat (450) within the at least one cryogen channel (468) within the cable (465).

In related embodiments, at least one of the conductors (466) may a conductor selected from the group of conductors consisting of copper (Cu), silver (Ag), aluminum, (Al), palladium (Pd), and platinum (Pt), and mixtures thereof. Equally, in some embodiments, at least one of the conductors (466) may include a superconductor material selected from the group of superconductors consisting of magnesium diboride ($MgB_2$), yttrium barium copper oxide (YBCO), bismuth strontium calcium copper oxide (BSSCO), niobium-titanium (NbTi), and triniobium-tin ($Nb_3Sn$), other high temperature superconductors and mixtures thereof.

In another series of embodiments, s superconducting electrical generator (10) (or motor) may include a plurality of cryostats (450) comprising at least a first cryostat (450) and a second cryostat (450), containing coolant. The first cryostat (450) may enclose at least one of a plurality of superconducting coils (480), and a first coil (480) may be in superconducting electrical communication with a second coil (480) contained in the second cryostat (450) through at least superconducting conduction cooling cable (465) enclosing a conductor (466), while none of the plurality of cryostats (450) are in fluid communication with the at least one superconducting conduction cooling cable (465). The cable (465) may be cooled by conduction along the conductor (466) from at least the first cryostat (450).

In such a series of embodiments, the conductor (466) may have at least a first segment maintained at a temperature higher than of the coolant of the first cryostat (450) and a second segment maintained at a temperature intermediate between the temperature of the first segment and the temperature of the coolant within the cryostat (450). By way of example and not limitation in such an embodiment, the first segment may be the portion of the cable (465) most distant from the cryostat (450), and the second portion may represent the section of the cable (465) closer to the cryostat (450). Equally, the conductor (466) may have at least a first segment maintained at a temperature higher than of the coolant of the first cryostat (450), a second segment maintained at a temperature intermediate between the temperature of the first segment and the temperature of the coolant within the cryostat (450), and a third segment maintained at the temperature of the coolant within the cryostat (450). Also by way of limitation only in such an embodiment, the first segment may be the portion of the cable (465) most distant from the cryostat (450), the third segment may that portion of the cable (465) in contact with the coolant within the cryostat (450), and the segment may be that portion of cable (465) in between the first and second segments.

As to materials, as with other embodiments, at least one of the conductors (466) may include a conductor selected from the group of conductors consisting of copper (Cu), silver (Ag), aluminum, (Al), palladium (Pd), and platinum (Pt), and mixtures thereof. Equally, at least one of the conductors (466) may include a superconductor material selected from the group of superconductors consisting of magnesium diboride ($MgB_2$), yttrium barium copper oxide (YBCO), bismuth strontium calcium copper oxide (BSSCO), niobium-titanium (NbTi), and triniobium-tin ($Nb_3Sn$), other types of high temperature superconductors and mixtures thereof. Also as to materials, in various embodiments, the coolant may be selected from the group of coolants consisting of, neon, helium or hydrogen.

As to construction, as with other embodiments, at least one superconducting conduction cooling cables (465) may be connected to the cryostat (450) through at least one quick connect fitting (469).

Numerous alterations, modifications, and variations of the preferred embodiments disclosed herein will be apparent to those skilled in the art and they are all anticipated and contemplated to be within the spirit and scope of the instant invention. Further, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims.

We claim:

1. A superconducting electrical generator (10) comprising:
  a plurality of cryostats (450) comprising at least a first cryostat (450) and a second cryostat (450), containing coolant wherein the first cryostat (450) encloses at least one of a plurality of superconducting coils (480), and a first coil (480) is in superconducting electrical communication with a second coil (480) contained in the second cryostat (450) through at least one superconducting conduction cooling cable (465) enclosing a conductor (466).

2. The device according to claim 1, wherein the superconducting conduction cooling cable (465) is in fluid communication with the first cryostat (450) through at least one cryogen channel (468) within the cable (465) and the conductor (466) is cooled below ambient temperature by the circulation of coolant from the cryostat (450) within the at least one cryogen channel (468) within the cable (465).

3. The device according to claim 1, wherein the first cryostat (450) and the second cryostat (450) enclosing superconducting coils (480) are in fluid communication through at least one cryogen channel (468) within the at least one superconducting conduction cooling cable (465).

4. The device according to claim 1, wherein the conductor (466) has at least a first segment maintained at a temperature higher than of the coolant of the first cryostat (450) and a second segment maintained at a temperature intermediate between the temperature of the first segment and the temperature of the coolant within the cryostat (450).

5. The device according to claim 1, wherein at least one of the conductors (466) comprises a conductor selected from the group of conductors consisting of copper (Cu), silver (Ag), aluminum, (Al), palladium (Pd), platinum (Pt), and mixtures thereof.

6. The device according to claim 1, wherein at least one of the conductors (466) comprises a superconductor material selected from the group of superconductors consisting of magnesium diboride ($MgB_2$), yttrium barium copper oxide (YBCO), bismuth strontium calcium copper oxide (BSSCO), niobium-titanium (NbTi), triniobium-tin ($Nb_3Sn$), and mixtures thereof.

7. The device according to claim 1, wherein none of the plurality of cryostats (450) are in fluid communication with the at least one superconducting conduction cooling cable (465) and the cable (465) is cooled by conduction along the conductor (466) from at least the first cryostat (450).

8. The device according to claim 1, wherein none of the plurality of cryostats (450) are in fluid communication with the at least one superconducting conduction cooling cable (465) and the cable (465) is cooled by conduction along the conductor (466) from at least the first cryostat (450) and the second cryostat (450).

9. The device according to claim 1, wherein the at least one superconducting conduction cooling cables (465) is connected to the cryostat (450) through at least one quick connect fitting (469).

10. The device according to claim 1, wherein the plurality of superconducting coils (480) consists of superconducting coils (480) selected from the group of superconducting coils (480) consisting of rotor coils, stator coils, and mixtures thereof.

11. A superconducting electrical generator (10) comprising:
  a. a plurality of cryostats (450) comprising at least a first cryostat (450) and a second cryostat (450), containing coolant wherein the first cryostat (450) encloses at least one of a plurality of superconducting coils (480), and a first coil (480) is in superconducting electrical communication with a second coil (480) contained in the second cryostat (450) through at least superconducting conduction cooling cable (465) enclosing a conductor (466), and
  b. the superconducting conduction cooling cable (465) is in fluid communication with the first cryostat (450) through at least one cryogen channel (468) within the cable (465) and the conductor (466) is cooled below ambient temperature by the circulation of coolant from the cryostat (450) within the at least one cryogen channel (468) within the cable (465).

12. The device according to claim 11, wherein at least one of the conductors (466) comprises a conductor selected from the group of conductors consisting of copper (Cu), silver (Ag), aluminum, (Al), palladium (Pd), platinum (Pt), and mixtures thereof.

13. The device according to claim 11, wherein at least one of the conductors (466) comprises a superconductor material selected from the group of superconductors consisting of magnesium diboride ($MgB_2$), yttrium barium copper oxide (YBCO), bismuth strontium calcium copper oxide (BSSCO), niobium-titanium (NbTi), triniobium-tin ($Nb_3Sn$), and mixtures thereof.

14. A superconducting electrical generator (10) comprising:
  a. a plurality of cryostats (450) comprising at least a first cryostat (450) and a second cryostat (450), containing coolant wherein the first cryostat (450) encloses at least one of a plurality of superconducting coils (480), and a first coil (480) is in superconducting electrical communication with a second coil (480) contained in the second cryostat (450) through at least superconducting conduction cooling cable (465) enclosing a conductor (466), and
  b. wherein none of the plurality of cryostats (450) are in fluid communication with the at least one superconducting conduction cooling cable (465) and the cable (465) is cooled by conduction along the conductor (466) from at least the first cryostat (450).

15. The device according to claim 14, wherein at least one of the conductors (466) comprises a conductor selected from the group of conductors consisting of copper (Cu) and silver (Ag), aluminum, (Al), palladium (Pd), platinum (Pt), and mixtures thereof.

16. The device according to claim 14, wherein at least one of the conductors (466) comprises a superconductor material selected from the group of superconductors consisting of magnesium diboride ($MgB_2$), yttrium barium copper oxide (YBCO), bismuth strontium calcium copper oxide (BSSCO), niobium-titanium (NbTi), triniobium-tin ($Nb_3Sn$), and mixtures thereof.

17. The device according to claim 14, wherein the conductor (466) has at least a first segment maintained at a temperature higher than of the coolant of the first cryostat (450) and a second segment maintained at a temperature intermediate between the temperature of the first segment and the temperature of the coolant within the cryostat (450).

18. The device according to claim 14, wherein the conductor (466) has at least a first segment maintained at a temperature higher than of the coolant of the first cryostat (450), a second segment maintained at a temperature intermediate between the temperature of the first segment and the temperature of the coolant within the cryostat (450), and a third segment maintained at the temperature of the coolant within the cryostat (450).

19. The device according to claim 14, wherein the at least one superconducting conduction cooling cables (465) is connected to the cryostat (450) through at least one quick connect fitting (469).

20. The device according to claim 14, wherein the coolant is selected from the group of coolants consisting of, neon, helium and hydrogen.

* * * * *